US009887918B1

(12) United States Patent
Stark

(10) Patent No.: US 9,887,918 B1
(45) Date of Patent: Feb. 6, 2018

(54) INTELLIGENT PACKET DATA REGISTER FILE THAT STALLS PICOENGINE AND RETRIEVES DATA FROM A LARGER BUFFER

(71) Applicant: Netronome Systems, Inc., Santa Clara, CA (US)

(72) Inventor: Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 290 days.

(21) Appl. No.: 14/530,762

(22) Filed: Nov. 2, 2014

(51) Int. Cl.
*G06F 9/30* (2006.01)
*H04L 12/741* (2013.01)

(52) U.S. Cl.
CPC ................................ *H04L 45/745* (2013.01)

(58) Field of Classification Search
None
See application file for complete search history.

(56) References Cited

U.S. PATENT DOCUMENTS

| 6,745,277 | B1* | 6/2004 | Lee ...................... G06F 12/0607 365/230.03 |
| 6,760,781 | B1* | 7/2004 | Wang ...................... H04L 49/90 370/216 |
| 9,417,916 | B1* | 8/2016 | Stark ........................ G06F 15/76 |
| 9,519,484 | B1* | 12/2016 | Stark ...................... G06F 9/3814 |

* cited by examiner

*Primary Examiner* — William B Partridge
(74) *Attorney, Agent, or Firm* — Imperium Patent Works LLP; T. Lester Wallace; Mark D. Marrello

(57) ABSTRACT

A multi-processor includes a pool of processors and a common packet buffer memory. Bytes of packet data of a packet are stored in the packet buffer memory. Each of the processors has an intelligent packet data register file. One processor is tasked with processing the packet data, and its packet data register file caches a subset of the bytes of packet data. Some instructions when executed require that the packet data register file supply the execute stage of the processor with certain bytes of the packet data. If during instruction execution the intelligent packet data register file determines that it does not store some of the necessary bytes, then the register file asserts a stall signal thereby stalling the processor, and retrieves the bytes from the packet buffer memory, and then supplies the retrieved bytes to the execute stage, and de-asserts the stall signal to unstall the processor.

20 Claims, 28 Drawing Sheets

PICOENGINE PROCESSOR

PICOENGINE MULTI-PROCESSOR

PICOENGINE MULTI-PROCESSOR

MANY SMALL SECTIONS OF SPECIALIZED CODE

ONE SECTION OF CODE

OCTETS IN ONE 128-BIT BLOCK OF INFORMATION

FETCH INSTRUCTION WHERE THE OFFSET IS A VALUE IN THE INITIAL FETCH INFO

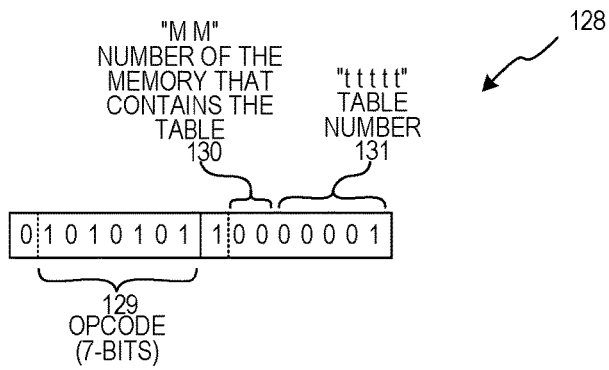

THE OFFSET INTO THE TABLE IS AN EIGHT-BIT PORTION OF THE INPUT DATA VALUE, WHERE THE NUMBER OF THE EIGHT-BIT PORTION IS GIVEN BY THE CURRENT VALUE OF THE PACKET POINTER

FETCH INSTRUCTION WHERE THE OFFSET IS A VALUE IN THE INPUT DATA VALUE

FIG. 9

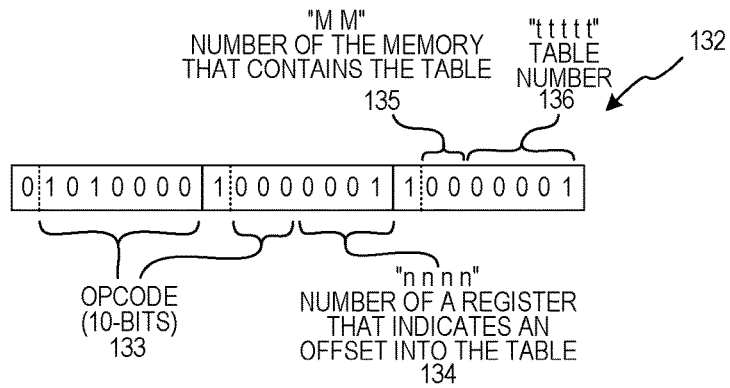

FETCH INSTRUCTION WHERE THE OFFSET VALUE IS IN A SPECIFIED REGISTER

FIG. 10

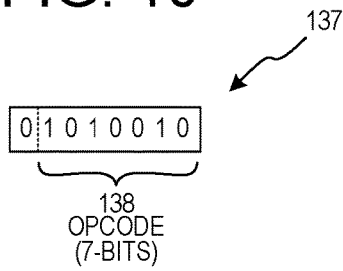

FETCH THE NEXT 128-BIT BLOCK OF INSTRUCTIONS AFTER THE LAST INSTRUCTION FETCHED. THE MEMORY IS THE SAME MEMORY FROM WHICH THE LAST INSTRUCTION WAS FETCHED.

FETCH MORE INSTRUCTION

FIG. 11

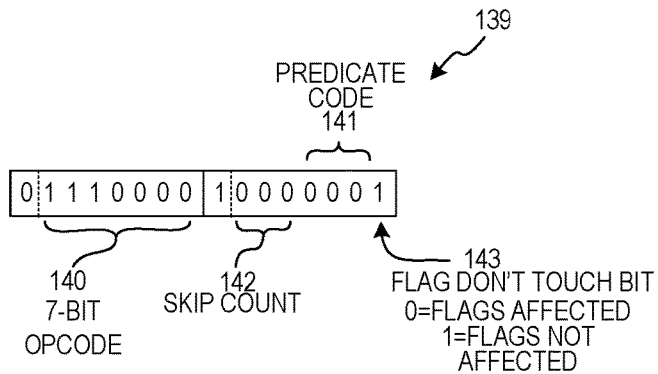

SKIP INSTRUCTION THAT SPECIFIES A SKIP COUNT AND
A PREDICATE FUNCTION

FIG. 12

| P | P | P | DESCRIPTION |
|---|---|---|---|
| 0 | 0 | 0 | ZERO FLAG IS SET |
| 0 | 0 | 1 | ANY FLAG IS SET |
| 0 | 1 | 0 | CARRY FLAG IS SET AND ZERO FLAG IS CLEAR |
| 0 | 1 | 1 | ALWAYS |
| 1 | 0 | 0 | NOT (ZERO FLAG IS SET) |
| 1 | 0 | 1 | NOT (ANY FLAG IS SET) |
| 1 | 1 | 0 | NOT ( CARRY FLAG IS SET AND ZERO FLAG IS CLEAR) |
| 1 | 1 | 1 | NOT (ALWAYS) |

PREDICATE CODES INDICATED BY THE PREDICATE BITS

FIG. 13

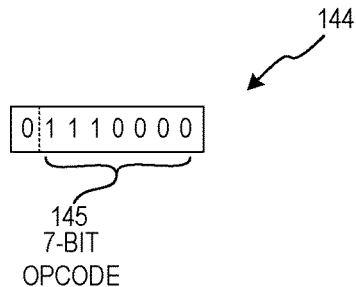

USES P BITS IN THE REGISTER FILE READ STAGE TO SPECIFY THE PREDICATE FUNCTION.

SINGLE-OCTET SKIP INSTRUCTION

FIG. 14

LOAD REGISTER FILE READ STAGE CONTROL REGISTER INSTRUCTION

LOAD DECODE STAGE CONTROL REGISTER INSTRUCTION

HASH, MOVE PACKET POINTER, AND PACKET
DATA PREFETCH INSTRUCTION
(hash.pkt16 [Mm]!)

PACKET DATA PREFETCH INSTRUCTION
(misc.pktpref16)

FINISHED INSTRUCTION

STATE DIAGRAM OF THE CLOCK CONTROL
AND PIPELINE CONTROL STATE MACHINE

TABLE NUMBER TO BASE ADDRESS
LOOKUP TABLE CIRCUIT

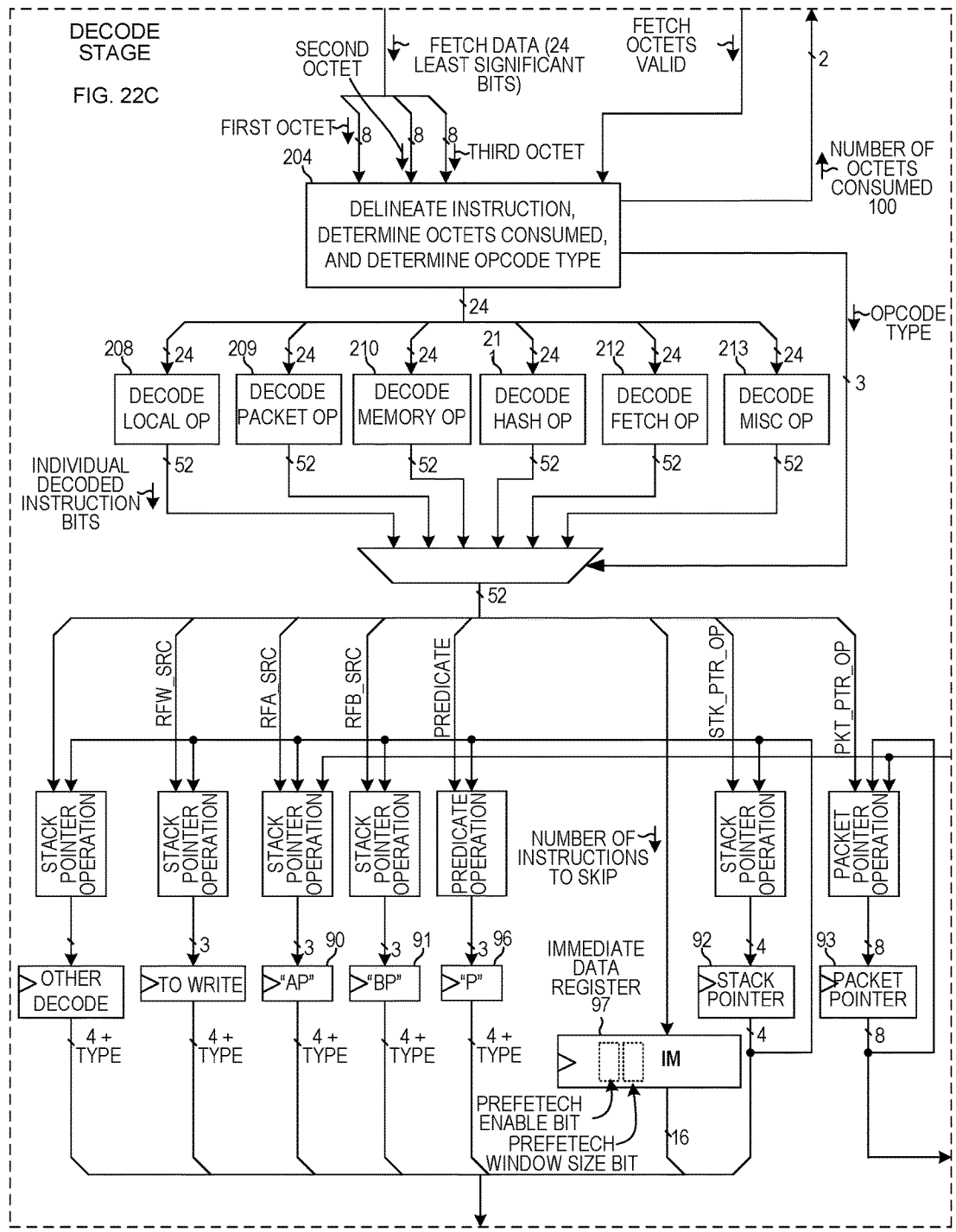

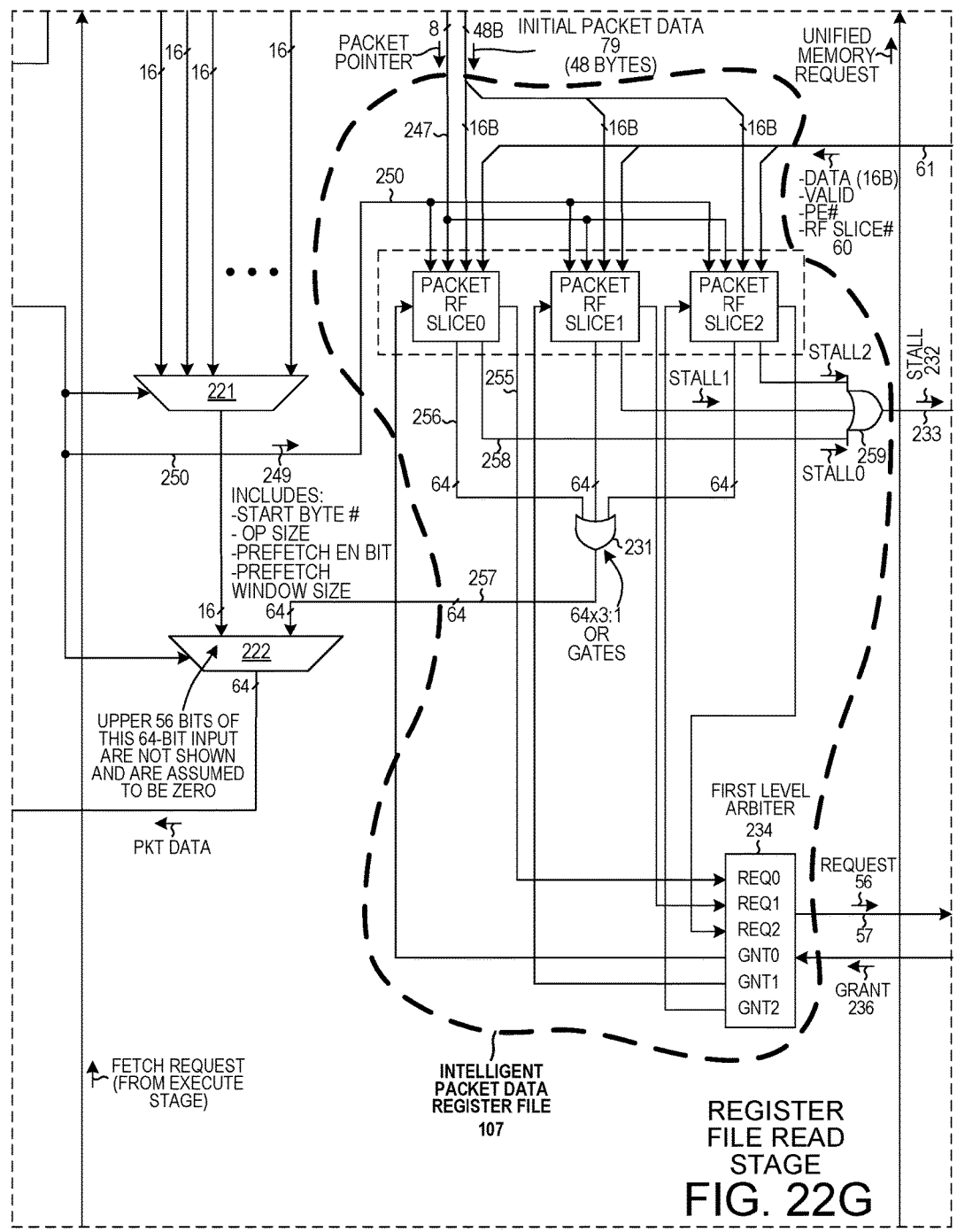

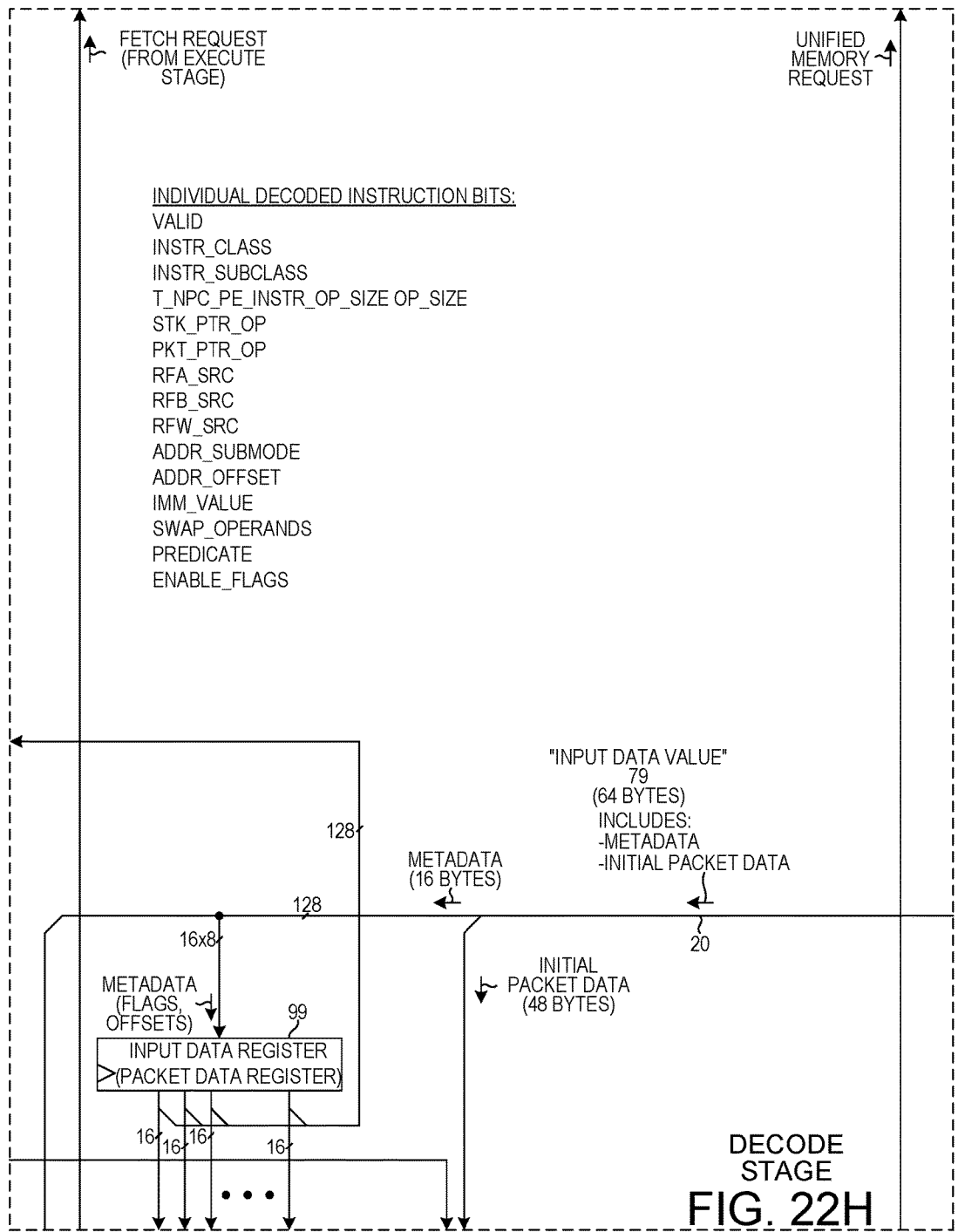

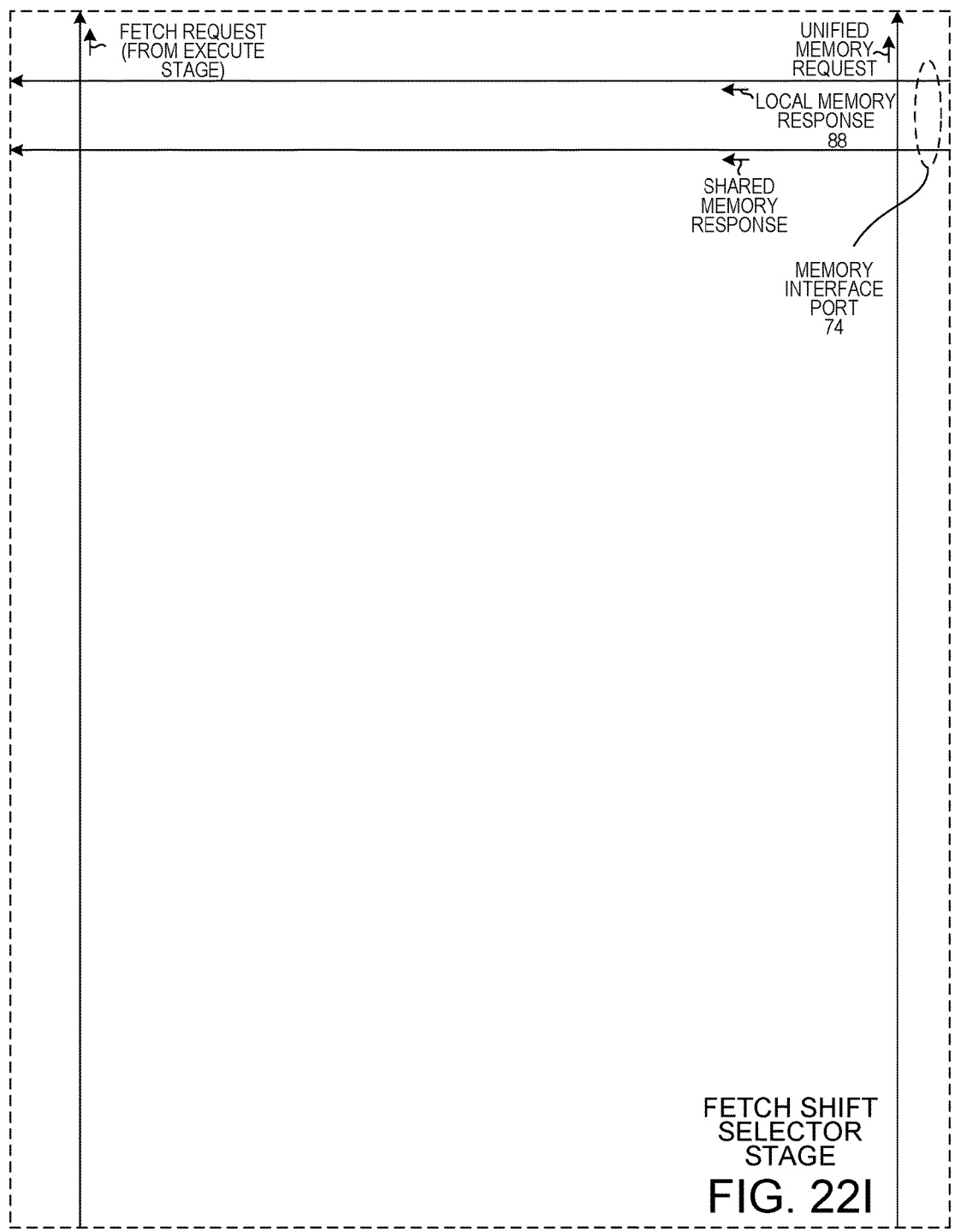

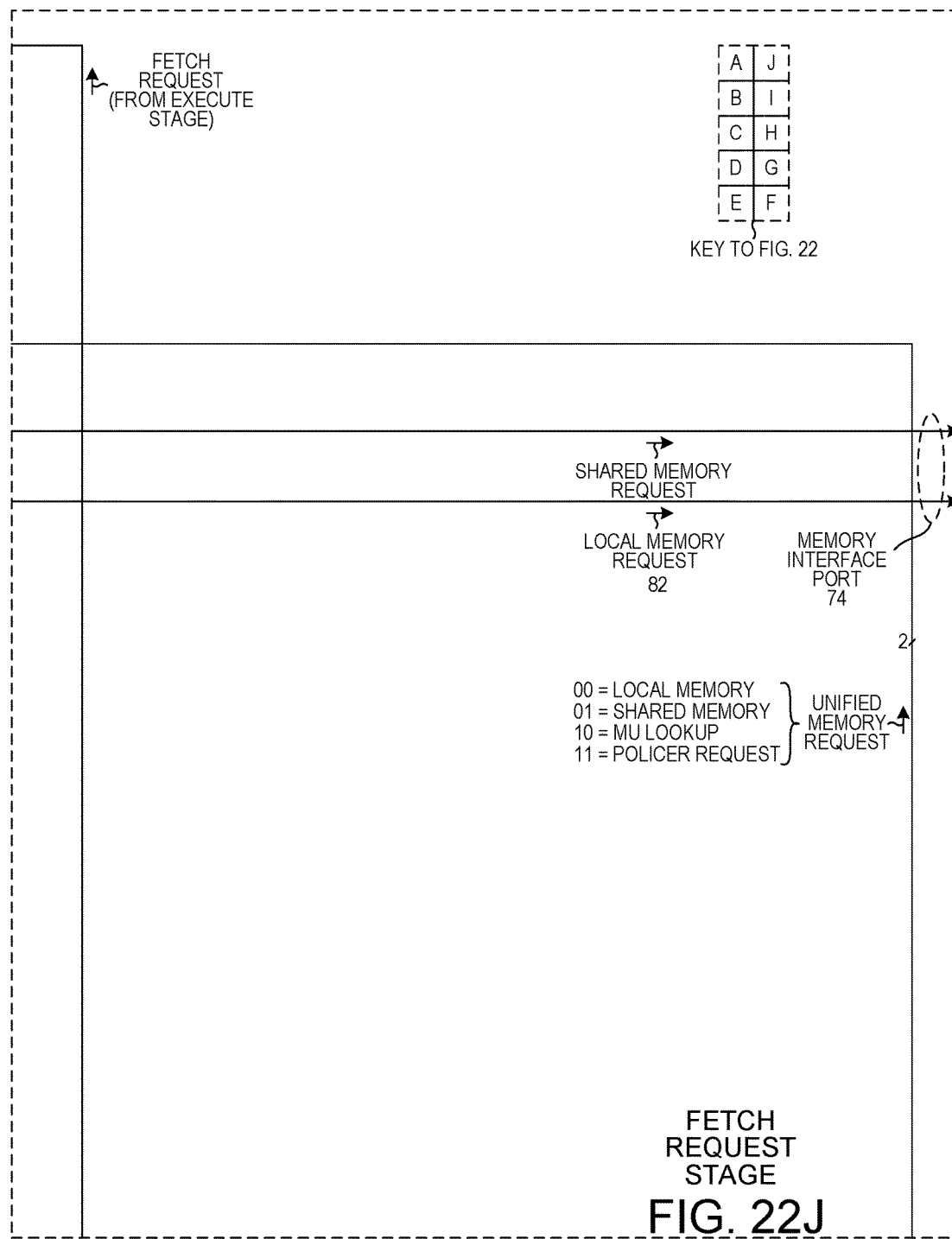

SHIFT DOWN BY AND
ADD NO-OP CIRCUIT

ONE SLICE PORTION OF THE
INTELLIGENT PACKET DATA REGISTER FILE

STATE DIAGRAM FOR THE STATE MACHINE OF
ONE SLICE PORTION OF THE INTELLIGENT
PACKET DATA REGISTER FILE

```
expand_entry "Expand entry":
  { rfe_is = 0;
    if (rf_entry==0) { rfe_is[0] = 1; }
    if (rf_entry==1) { rfe_is[1] = 1; }
    if (rf_entry==2) { rfe_is[2] = 1; } } state_machine "State Machine":
  { pmem_data_ready = 0;
    if ((pm_resp.tag[2;0] == rf_entry) && pm_resp.valid) {
       pmem_data_ready = 1; }
    full_switch (prf.fsm_state)
  { case fsm_data_valid:
    { if (rfr_pkt_data_not_ready) {
         prf.fsm_state  <= fsm_requesting_data;
         prf.data_offset <= ( match_pd_rfa[0] ?
            pd_rfr_a[4;4] : (1+pd_rfr_a[4;4]) ); }
      elsif (pref_des!=0) {
         prf.fsm_state  <= fsm_requesting_data;
         prf.data_offset <= ( pref_des[0] ?
            pd_pkt_ptr[4;4] : (1+pd_pkt_ptr[4;4]) ); }
      if (picoengine_starting) {
         prf.fsm_state <= fsm_data_valid; } }
    case fsm_requesting_data:
    { if (picoengine_starting) {
         prf.fsm_state <= fsm_start_was_req;
         if (pm_resp.grant) {
            prf.fsm_state <= fsm_waiting_to_disc; } }
      elsif (pm_resp.grant) {
         prf.fsm_state <= fsm_waiting; } }
    case fsm_waiting:
    { if (picoengine_starting) {
         prf.fsm_state <= fsm_waiting_to_disc;
         if (pmem_data_ready) {
            prf.fsm_state <= fsm_data_valid; } }
      elsif (pmem_data_ready) {
         prf.fsm_state <= fsm_data_valid; } }
    case fsm_waiting_to_disc:
    { if (pmem_data_ready) {
         prf.fsm_state <= fsm_data_valid; } }
    case fsm_start_was_req:
```

FIG. 26A

```
{ prf.fsm_state <= fsm_data_valid;
  if (pm_resp.grant) {
    prf.fsm_state <= fsm_waiting_to_disc; } }
default:
{ prf.fsm_state <= fsm_data_valid; } }
if (picoengine_starting) {
  prf.data_offset <= pin_ofs; }
pm_req.valid=(prf.fsm_state==fsm_requesting_data);
pm_req.offset = prf.data_offset}; } write_pkt_data "Logic to Write Data Into Packet Data Register";
{ pkt_in_map = rfe_is;
  pin_ofs = (packet_in.packet_data_offset[4;3]
            + bundle(2b0, rf_entry));
  full_switch (packet_in.packet_data_offset[4;3])
  { case 0, 3, 6, 9, 12, 15: { pkt_in_map = rfe_is; }
    case 1, 4, 7, 10, 13:{ pin_ofs=pin_ofs+(rfe_is[0]?4h2:4hf);
        pkt_in_map = bundle( rfe_is[0], rfe_is[2;1] ); }
    case 2, 5, 8, 11, 14:{ pin_ofs=pin_ofs+(rfe_is[2]?4he:4h1);
        pkt_in_map = bundle( rfe_is[2;0], rfe_is[2] ); } }
  packet_in_src[0] = 0;
  packet_in_src[1] = 0;
  if (pkt_in_map[0]) {
    packet_in_src[0] |= packet_in.packet_data_0;
    packet_in_src[1] |= packet_in.packet_data_1; }
  if (pkt_in_map[1]) {
    packet_in_src[0] |= packet_in.packet_data_2;
    packet_in_src[1] |= packet_in.packet_data_3; }
  if (pkt_in_map[2]) {
    packet_in_src[0] |= packet_in.packet_data_4;
    packet_in_src[1] |= packet_in.packet_data_5; }
  if (picoengine_starting) {
    pkt_r1 <= packet_in_src[1];
    pkt_r0 <= packet_in_src[0]; }
  elsif (pmem_data_ready && (prf.fsm_state==fsm_waiting)) {
    pkt_r0 <= bundle( pm_resp.data_low[8; 0],
                      pm_resp.data_low[8; 8],
                      pm_resp.data_low[8;16],
                      pm_resp.data_low[8;24],
                      pm_resp.data_low[8;32],
                      pm_resp.data_low[8;40],
                      pm_resp.data_low[8;48],
```

FIG. 26B

```
                               pm_resp.data_low[8;56] );
           pkt_r1 <= bundle( pm_resp.data_high[8; 0],
                             pm_resp.data_high[8; 8],
                             pm_resp.data_high[8;16],
                             pm_resp.data_high[8;24],
                             pm_resp.data_high[8;32],
                             pm_resp.data_high[8;40],
                             pm_resp.data_high[8;48],
                             pm_resp.data_high[8;56] ); } } read_pkt_data "Data Selector and Data Offset":
      { /*b Determine if this entry matches pd_rfr_a[4;4]+0/1 */
        match_pd_rfa = 2b00;
        full_switch (pd_rfr_a[4;4])
      { case 0, 3, 6, 9, 12, 15:{match_pd_rfa=rfe_is[2;0]; }
        case 1, 4, 7, 10, 13   :{match_pd_rfa=rfe_is[2;1]; }
        case 2, 5, 8, 11, 14   :{match_pd_rfa=bundle(rfe_is[0],
                                      rfe_is[2] ); } }

/*b Determine shift and mask control - data selector */
        lshf = bundle(1b0, pd_rfr_a[4;0]);
        full_switch (pd_instr_op_size)
      { case instr_op_size_8 : {lshf=5h0+bundle(1b0,pd_rfr_a[4;0]);}
        case instr_op_size_16:{lshf=5h1+bundle(1b0,pd_rfr_a[4;0]);}
        case instr_op_size_32:{lshf=5h3+bundle(1b0,pd_rfr_a[4;0]);}
        case instr_op_size_48:{lshf=5h5+bundle(1b0,pd_rfr_a[4;0]);}
        default:              {lshf=5h7+bundle(1b0,pd_rfr_a[4;0]);}  }
        pkt_data = 0;
        rfr_mask = 8b11111111;
        full_switch ( lshf[4;0] )
      { case 0: { rfr_mask = 8b00000001;
            pkt_data = bundle( pkt_r1[56; 0], pkt_r0[ 8;56] ) ;}
        case 1: { rfr_mask = 8b00000011;
            pkt_data = bundle( pkt_r1[48; 0], pkt_r0[16;48] ) ;}
        case 2: { rfr_mask = 8b00000111;
            pkt_data = bundle( pkt_r1[40; 0], pkt_r0[24;40] ) ;}
        case 3: { rfr_mask = 8b00001111;
            pkt_data = bundle( pkt_r1[32; 0], pkt_r0[32;32] ) ;}
        case 4: { rfr_mask = 8b00011111;
            pkt_data = bundle( pkt_r1[24; 0], pkt_r0[40;24] ) ;}
        case 5: { rfr_mask = 8b00111111;
            pkt_data = bundle( pkt_r1[16; 0], pkt_r0[48;16] ) ;}
```

FIG. 26C

```
case  6: { rfr_mask = 8b01111111;
          pkt_data = bundle( pkt_r1[ 8; 0], pkt_r0[56; 8] ) ;}
case  7: { rfr_mask = 8b11111111;
          pkt_data = bundle( pkt_r0[64; 0] ) ;}
case  8: { rfr_mask = 8b11111111;
          pkt_data = bundle( pkt_r0[56; 0], pkt_r1[ 8;56] ) ;}
case  9: { rfr_mask = 8b11111111;
          pkt_data = bundle( pkt_r0[48; 0], pkt_r1[16;48] ) ;}
case 10: { rfr_mask = 8b11111111;
          pkt_data = bundle( pkt_r0[40; 0], pkt_r1[24;40] ) ;}
case 11: { rfr_mask = 8b11111111;
          pkt_data = bundle( pkt_r0[32; 0], pkt_r1[32;32] ) ;}
case 12: { rfr_mask = 8b11111111;
          pkt_data = bundle( pkt_r0[24; 0], pkt_r1[40;24] ) ;}
case 13: { rfr_mask = 8b11111111;
          pkt_data = bundle( pkt_r0[16; 0], pkt_r1[48;16] ) ;}
case 14: { rfr_mask = 8b11111111;
          pkt_data = bundle( pkt_r0[ 8; 0], pkt_r1[56; 8] ) ;}
case 15: { rfr_mask = 8b11111111;
          pkt_data = bundle( pkt_r1[64; 0] ) ;} }
if (!lshf[4]) {
   rfr_mask = 0; }

/*b Determine which bytes to present based on pd_rfr_a */
if (match_pd_rfa[0]) {
   read_select_mask = ~rfr_mask; }
if (match_pd_rfa[1]) {
   read_select_mask = rfr_mask; }

/*b Determine bytes that have to be valid */
required_data_mask = 8b11111111;
full_switch (pd_instr_op_size)
{ case instr_op_size_8:  { required_data_mask = 8b00000001; }
  case instr_op_size_16: { required_data_mask = 8b00000011; }
  case instr_op_size_32: { required_data_mask = 8b00001111; }
  case instr_op_size_48: { required_data_mask = 8b00111111; }
  default:               { required_data_mask = 8b11111111; } }

/*b Drive output bus with our bytes */
rfr_pkt_bus = pkt_data;
for (i; 8)
{ if ( !read_select_mask[i] || !required_data_mask[i] ) {
```

FIG. 26D

```
          rfr_pkt_bus[8;8*i] = 0; } }
       rfr_pkt_data_not_ready = 0;
       if ((required_data_mask & read_select_mask)!=0) {
          if (match_pd_rfa[0]) {
             if ((prf.fsm_state!=fsm_data_valid) ||
                (prf.data_offset!=pd_rfr_a[4;4]))
             { rfr_pkt_data_not_ready = 1; } }
          if (match_pd_rfa[1]) {
             if ((prf.fsm_state!=fsm_data_valid) ||
                (prf.data_offset!=(1+pd_rfr_a[4;4])))
             { rfr_pkt_data_not_ready = 1; } } }
       if (!pd_data_required) { rfr_pkt_data_not_ready = 0; } } prefetch_detection "fetch and prefetch decode" :
    { /*b Does entry match pd_pkt_ptr[4;4] or pd_pkt_ptr[4;4]+1 */
       can_match = 2b00;
       full_switch (pd_pkt_ptr[4;4])
    { case 0, 3, 6, 9, 12, 15: { can_match = rfe_is[2;0]; }
      case 1, 4, 7, 10, 13    : { can_match = rfe_is[2;1]; }
      case 2, 5, 8, 11, 14    : { can_match = bundle( rfe_is[0],
                                               rfe_is[2] ); } }

/*b Determine if prefetch is possible to get pkt_ptr */
       pref_pos = 0;
       if (can_match[0]) {
          if ((prf.fsm_state==fsm_data_valid) &&
             (prf.data_offset!=pd_pkt_ptr[4;4]))
          { pref_pos[0] = 1; } }
       if (can_match[1]) {
          if ((prf.fsm_state==fsm_data_valid) &&
             (prf.data_offset!=1+pd_pkt_ptr[4;4]))
          { pref_pos[1] = 1; } }
       pref_des = 0;
       full_switch (pkt_pref_des)
    { case pkt_prefetch_16: {pref_des = bundle(1b0,pref_pos[0]);}
      case pkt_prefetch_32: {pref_des = pref_pos;}
      default: { pref_des = 0; } } }
```

FIG. 26E

INTELLIGENT PACKET DATA REGISTER FILE THAT STALLS PICOENGINE AND RETRIEVES DATA FROM A LARGER BUFFER

TECHNICAL FIELD

The described embodiments relate generally to multi-processor systems for processing packet data, and to related methods.

SUMMARY

A multi-processor includes a pool of very efficient and small pipelined run-to-completion picoengine processors and a common packet buffer memory. Each of the pipelined processors has a decode stage, a register file read stage, and an execute stage. The decode stage includes a packet pointer register, where the content of this packet pointer register is a byte number that identifies one of the bytes of packet data. The register file read stage includes a novel intelligent packet data register file that can cache certain bytes of the packet data. An amount of packet data is loaded into the packet buffer memory at the beginning of the processing of the packet data, and one of the processors is assigned the task of processing and analyzing that packet data. The intelligent packet data register file is initially loaded with a subset of the bytes of the larger amount of packet data stored in the packet buffer memory. The pipelined processor then executes instructions, and thereby processes and analyzes the packet data.

In a first novel aspect, the processor executes an instruction, where the execution of the instruction requires that the intelligent packet data register supply a particular set of the bytes of the packet data to the execute stage. The intelligent packet data register file, however, does not store at least some of those bytes. The intelligent packet data register file detects this condition, and issues a packet portion request and also asserts a stall signal. The stall signal causes the clock signal supplied to the processor to be stopped. The pipeline of the processor is therefore stalled. The packet portion request is supplied from the processor and to the packet buffer memory through a packet portion request bus system. This system, which includes an arbiter, communicates packet portion requests from the various picoengine processors of the pool to the packet buffer memory. The packet portion request in one example includes a starting byte number, a number of bytes, an identifier of the picoengine processor that issued the request, and an identifier of the slice portion of the intelligent packet data register file that issued the request. The packet buffer memory receives the packet portion request, and reads the indicated bytes of packet data from its memory, and sends the indicated bytes of packet data back to the requesting processor via a packet portion data bus. The bytes of data are sent in the form of a packet portion response. The packet portion response includes the requested bytes of packet data, the identifier of the requesting processor, and the identifier of the slice portion. The packet portion response is received at the same time in parallel by all processors of the pool, but only the one processor indicated by the processor identifier in the response loads in the response data. The data is loaded into the intelligent packet data register file of the processor. The intelligent packet data register file of the processor then supplies the bytes of packet data necessary for execution of the instruction to the execute stage of the processor. The intelligent packet data register file de-asserts the stall signal thereby causing the clocking of the processor pipeline to resume. The processor is "unstalled", and completes execution of the instruction using the bytes of packet data retrieved from the packet buffer memory.

In a second novel aspect, the intelligent packet data register has a packet data prefetch functionality. The processor maintains packet data prefetch configuration and control information, including a packet data prefetch window size value and a packet data prefetch enable bit value. The intelligent packet data register file detects a packet data prefetch trigger condition. In one example, the changing of the packet pointer value is a packet data prefetch trigger condition. If packet data prefetching is enabled as indicated by the packet data register file, and if packet data prefetching is not disabled (for example, due to a prefetch optional disable bit in the instruction that caused the trigger condition), then the intelligent packet data register file determines those bytes of packet data that are in a packet data prefetch window. In one example, the packet data prefetch window of bytes starts at the byte pointed to by the packet data pointer value, and includes a number of consecutive bytes as indicated by the packet data prefetch window size value. The intelligent packet data register file also maintains a record of all the bytes of packet data that it stores. If there is one or more byte in the prefetch window that is/are not stored by the intelligent packet data register file, then the intelligent packet data register file issue one or more packet portion requests to retrieve those bytes of packet data from the packet buffer memory. The stall signal is not asserted and the processor is not stalled. The packet buffer memory receives the packet portion request or requests, and returns the requested bytes of packet data in a packet portion response. The intelligent packet data register file receives the packet portion response or responses, and stores the bytes of packet data. At this point, the intelligent packet data register file stores all the bytes of packet data in the prefetch window. It is possible that no future instruction will be executed which will use this packet data before the contents of the packet data register file are overwritten, or until the processing of the packet is completed. It is also possible, however, that a subsequent instruction will be executed by the processor where the some or all of the prefetched packet data is to be supplied to the execute stage in execution of the instruction. When the instruction is processed through the pipeline to the point that the packet data is to be supplied to the execute stage, the packet data register file contains all the necessary packet data and the processor does not need to be stalled.

In a third novel aspect, the instruction set of the processor includes instructions that can change the packet portion prefetch configuration and control information. In one example, the instruction set includes an instruction whose execution can change the packet data prefetch enable bit value. In one example, the instruction set includes an instruction whose execution can change the packet data prefetch window size value. In one example, the instruction set includes an instruction whose execution can change the value of the packet data pointer, but that also includes a bit that controls whether or not the changing of the packet data pointer as a result of execution of the current instruction will be disabled from triggering a packet portion prefetch. In one example, the instruction set includes an instruction whose execution does not change the value of the packet data pointer but that nonetheless causes a packet data prefetch trigger condition to occur.

In a fourth novel aspect, the intelligent packet data register file comprises a set of substantially identical slice portions. Each slice portion is responsible for handling and storing different bytes of the packet data. In one example, there are three slice portions. The first slice portion SLICE0 is responsible for byte numbers 0, 3, 6, 9, and so forth. The second slice portion SLICE1 is responsible for byte numbers 1, 4, 7, 10, and so forth. The third slice portion SLICE2 is responsible for byte numbers 2, 5, 8, 11, and so forth. These byte numbers correspond to the byte numbers of the bytes of packet data as they are stored in the packet buffer memory. Each slice portion maintains a record of the bytes that it is currently storing. The slice portion is of limited size, and can only store a few of the bytes it is responsible for handling. If an instruction is being executed in the processor that requires packet data to be supplied to the execute stage, then each slice portion determines for itself whether it (that slice portion) is responsible for storing any of the bytes needed for execution of the instruction, and if the slice portion is responsible for storing any such bytes then the slice portion determines whether it (that slice portion) is storing all these required bytes. If the slice portion determines that it is not storing all the required bytes for which it is responsible, then the slice portion outputs a stall signal and issues a packet portion request for the bytes it needs. The slice portions carry out these determinations separately and independently of one another. One or more slice portions may assert stall signals and issue packet portions requests, depending on what particular bytes are stored in the intelligent packet data register file and what bytes are being called for by the instruction being executed. If any one of the slice portions asserts its stall signal, then the processor is stalled. When the packet buffer memory returns bytes of packet data in one or more packet portions responses, each slice portions receives its indicated bytes. When a slice portion that asserted a stall signal has all the bytes it needs to supply to the execute stage, then that slice portion de-asserts the stall signal it has been outputting. When all the slice portions have de-asserted their stall signals, then the processor resumes clocking and the proper ones of the bytes of packet data (as output by the slice portions as a group) are used by the execute stage.

In one example, each slice portion outputs bytes it is responsible for in an appropriately shifted and masked fashion such that the overall amount of packet data required on the inputs of the execute stage is aligned with respect to an edge conductor of the bus of conductors that outputs packet data. This edge conductor is referred to here as the "least significant" bit conductor of the bus of conductors. The output of the intelligent packet data register file is said to be "left-aligned", where the left-most conductor of the bus is assumed to be the least significant bit conductor of the bus. For example, if only one byte of packet data is required by the execute stage, then that one byte of packet data will be presented on the bus of conductors such that the byte is carried on the least significant eight conductors (referred to as the leftmost eight conductors) of the bus of conductors. All other conductors of the bus of conductors will be driven with digital zeros. The reference here to "left", and to "least significant", is made for illustrative purposes and are understood to be relative terms. They are used to illustrate an example of an edge alignment with respect to an ordering of the conductors of the output bus. In this sense, the terms "left" and "least significant" are conceptual relational terms with respect to the ordering employed. The valid bytes as output from the intelligent packet data register file are output in the edge aligned fashion with respect to an ordering of the conductors of the bus, where this ordering is dictated by the requirements of the execute stage and how it needs to receive the requested bytes.

In one example, each slice portion also handles issuing packet portion requests to support the novel packet data prefetching described above. If a packet data prefetching trigger condition is detected, and if packet data prefetching is enabled, then each slice portion determines whether the packet data prefetch window contains any bytes that the slice portion is responsible for and that the slice portion is not currently storing. If there are any such bytes, then the slice portion issues a packet portion request to retrieve those bytes from the packet buffer memory. The slice portion handles receiving any packet portion response, and loads the retrieved prefetch bytes. Each slice portion performs these prefetch operations separately and independently of the other slice portions. Each slice portion handles shifting its contents, and masking certain bit values output from the slice portion to be zeros, so that the overall packet data output of the intelligent packet data register file is supplied onto the bus of conductors in the properly aligned fashion according to the requirements of the execute stage.

Further embodiments and related methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a diagram of a fetch instruction in which the offset value is a value in the input data value.

FIG. 10 is a diagram of a fetch instruction in which the offset value is in a specified register of the register file of the processor.

FIG. 11 is a diagram of a fetch more instruction.

FIG. 12 is a diagram of a skip instruction that specifies a skip count and a predicate function.

FIG. 13 is a table illustrating the meaning of predicate bits in the instruction of FIG. 12.

FIG. 14 is a diagram of a single-octet skip instruction.

FIG. 22 is a diagram of a specific example of the pipeline of the picoengine processor of FIG. 3.

FIG. 22C is a part of the larger diagram of FIG. 22.

FIG. 22G is a part of the larger diagram of FIG. 22.

FIG. 22H is a part of the larger diagram of FIG. 22.

FIG. 22I is a part of the larger diagram of FIG. 22.

FIG. 22J is a part of the larger diagram of FIG. 22.

FIG. 26A is a diagram of a part of a larger diagram of FIG. 26, where FIG. 26 is a hardware description (in the CDL hardware description language) of a particular embodiment of a slice portion of the intelligent packet data register file.

FIG. 26B is a part of the larger diagram of FIG. 26.

FIG. 26C is a part of the larger diagram of FIG. 26.

FIG. 26D is a part of the larger diagram of FIG. 26.

FIG. 26E is a part of the larger diagram of FIG. 26.

DETAILED DESCRIPTION

Reference will now be made in detail to background examples and some embodiments of the invention, examples of which are illustrated in the accompanying drawings.

Figure 1:
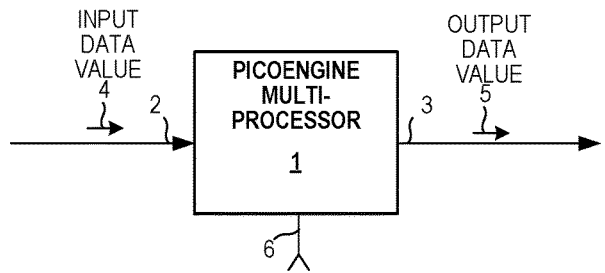
FIG. 1 is a diagram of picoengine multi-processor in accordance with one novel aspect.

FIG. 1 is a high-level block diagram of a picoengine multi-processor (PEMP) 1 in accordance with one novel aspect. The PEMP 1 receives input data to process on input port 2, processes the data thereby generating output data, and outputs the output data on output port 3. The input data in this case is a stream of multi-bit digital input data values. Reference number 4 identifies one of the input data values. The output data also is a stream of multi-bit digital output data values, where there is an output data value in the output data stream for each input data value in the input data stream. Reference number 5 identifies one of the output data values. Reference numeral 6 identifies a configuration input port.

Figure 2:
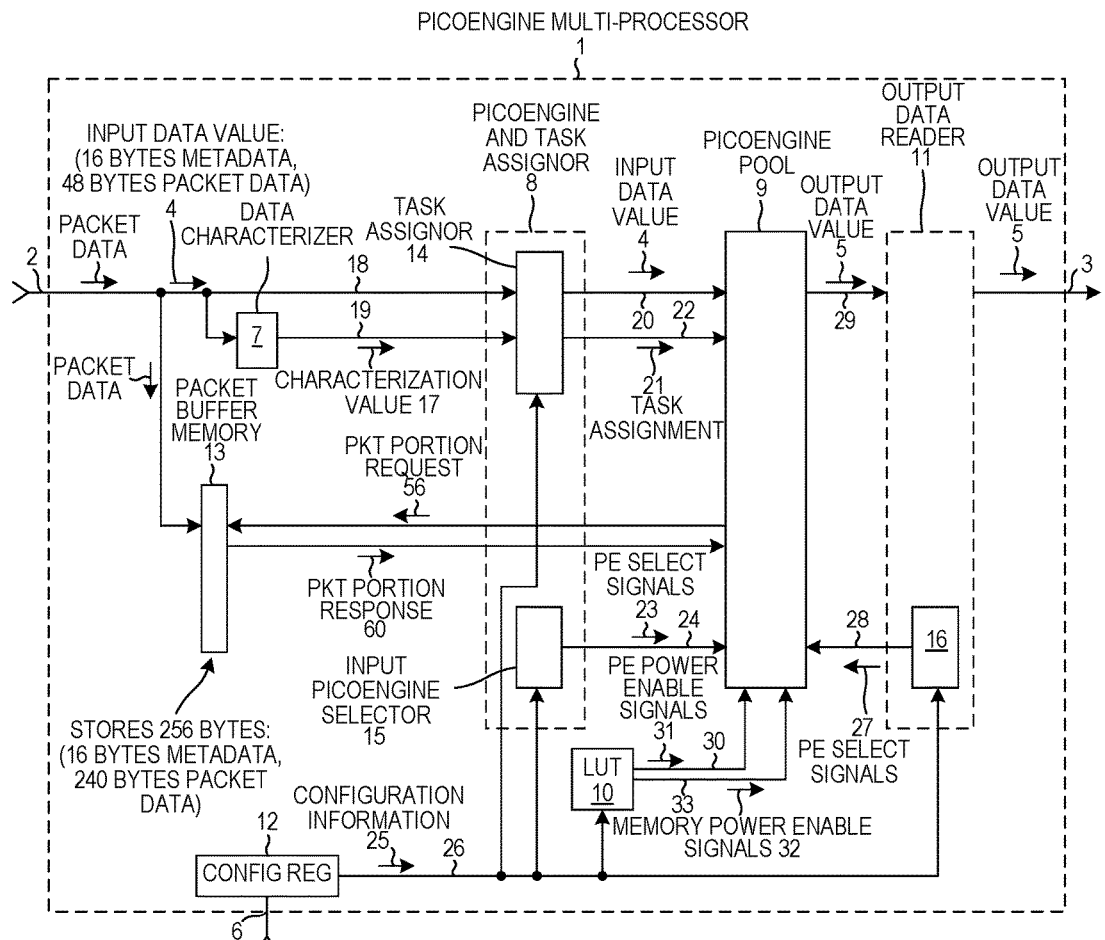
FIG. 2 is a more detailed block diagram of the picoengine multi-processor of FIG. 1.

FIG. 2 is a more detailed diagram of the PEMP 1 of FIG. 1. PEMP 1 includes a data characterizer 7, a picoengine and task assignor 8, a picoengine pool 9, a Look Up Table (LUT) circuit 10, an output data reader 11, a configuration register 12, and a packet buffer memory 13. The picoengine and task assignor 8 in turn includes a task assignor 14 and an input picoengine selector 15. The output data reader 11 includes an output picoengine selector 16.

In operation, the input data value 4 is received onto PEMP 1 via input port 2. The data characterizer 7 analyzes the input data value 4 and generates a characterization value 17. Typically, the data characterizer is an amount of high-speed combinatorial logic. In this example, the characterization value 17 is a multi-bit digital value, each bit of which indicates whether the corresponding input data value 4 has a corresponding characteristic. At a particular time, the input data value 4 and the corresponding characterization value 17 are clocked into the task assignor 14 from conductors 18 and 19. The input data value 4 is then available on conductors 20 to the picoengine pool 9. In a preferred embodiment, both the input data value 4 and its corresponding characterization value 17 are supplied together to the picoengine pool 9. Regardless of whether the input data value alone or the input data value and its characterization value are supplied together to the picoengine pool, the task assignor 14 receives the characterization value 17 and from it generates an appropriate task assignment 21. The task assignment 21 is supplied to the picoengine pool 9 via conductors 22. The task assignment 21 is indicative of one of several different processing tasks that the picoengine pool can be instructed to perform on the input data value.

The input data value 4, along with the remainder of the input data of which the input data value 4 is a part, is stored in the packet buffer memory 13. In one specific example, the input data value 4 (64 bytes) is a part of larger amount of data (256 bytes). The larger amount of data includes a MAC prepend (16 bytes of metadata including flags and offsets) and the first 240 bytes of an ethernet frame (also referred to here as a packet), including the ethernet header, and an IP header, and possibly other higher layer headers, and possibly an initial amount of a data payload. This entire larger amount of data (16 bytes of metadata and 240 bytes of packet data) is stored in the packet buffer memory 13. The 256 bytes of this information have an order in the packet, and the bytes are stored in the packet buffer memory 13 in that same order.

The picoengine pool 9 includes a large number (in this case forty-eight) of small processors, referred to as "picoengines". In addition, picoengine pool 9 includes a number of associated memories (in this case there are twelve local memories), where sets of instructions that the picoengines can execute are stored in the memories. The input picoengine selector 15 assigns one of the picoengines the task to handle the input data value 4. The assigned picoengine is indicated by the PE select signals 23 that are output by the input picoengine selector 15 onto conductors 24. In the present example, the PE select signals 23 are forty-eight single bit digital signals, where each individual signal is a signal that is carried by a corresponding one of forty-eight conductors 24 to a corresponding one of the forty-eight picoengines. The PE select signal indicates whether the corresponding picoengine is selected to receive the task of processing the input data value. Only one of the PE select signals is asserted at a time, so at most one picoengine is selected at a time. As input data values pass input PEMP 1, the input picoengine selector 15 assigns picoengines one-by-one in one of a plurality of selected sequences. The particular sequence that is used is determined by three bits of the configuration information 25 on conductors 26. Picoengines are selected one-by-one in the selected sequence until each of picoengines has been selected, and then the sequence repeats. In the case of input data value 4, a picoengine PE5 is selected to perform the assigned task on this input data value. The picoengine PE5 is selected due to the PE select signal for PE5 being asserted, and in response picoengine PE5 receives the input data value 4 from conductors 20 and receives the task assignment 21 from conductors 22. The picoengine PE5 then executes instructions out of one or more of the memories of the picoengine pool 9, thereby performing the assigned task on the input data value 4 as indicated by the task assignment 21.

In addition to the input picoengine selector 15, there is the output picoengine selector 16. The output picoengine selector 16 also generates PE select signals 27 and supplies these PE select signals to the picoengine pool 9 via conductors 28. The PE select signals 27 supplied by the output picoengine selector 16 are similar to the PE select signals 239 supplied by the input picoengine selector 15 in that there are forty-eight PE select signals, one for each of the forty-eight picoengines. Only one of the PE select signals 27 is asserted at a given time, so the PE select signals 27 can only identify one picoengine at a given time. The output picoengine selector 16 selects picoengines one-by-one in the same sequence that the input picoengine selector 15 used to assign picoengines. In the present example, when the picoengine PE5 that processed the input data value 4 completes its task, it generates the output data value 5. The PE select signals 23 identify picoengine PE5 to be the next picoengine to output its data. The picoengine PE5 receives the PE select signal. This signal is asserted. In response, the picoengine PE5 outputs the output data value 5. The output data value 5 passes via conductors 29, through the output data reader 11, and to the output port 3. Accordingly, the input picoengine selector assigns picoengines in the selected sequence, and the output picoengine selector uses this same selected sequence to read the resulting output data values from the picoengines. The configuration information 25 determines the sequence used. The configuration information 25 is loaded into PEMP 1 via configuration input port 6. For each input data value, the task performed is dependent upon the input data itself, where the task assigned is determined by the characterization value 17 that in turn is based on the input data value.

The particular sequence used by the input picoengine selector 15 and the output picoengine selector 16 is determined by three bits of the configuration information 25 on conductors 26. In some sequences, there are more picoengines in the picoengine pool 9 than there are separately assigned picoengines in the sequence. Accordingly, as the PE select signals are cycled through their sequences, some of the picoengines in the picoengine pool are never assigned a task. LUT circuit 10 supplies a PE power enable signal to each of the picoengines. Each PE power enable signal is communicated from the LUT circuit 10 to the corresponding picoengine via a dedicated conductor. The forty-eight conductors that carry the PE power enable signals are identified by reference numeral 30. If the PE power enable signal is not asserted, then the picoengine that receives the PE power enable signal is not enabled (is disabled). From the configuration information 25, LUT circuit 10 determines which ones of the picoengines will not be used and outputs appropriate PE power enable signals 31 to disable those unused picoengines. In one example, the PE power enable signal causes its corresponding picoengine to be disabled by causing the clock signal of the picoengine to be gated off so that the picoengine is not clocked. If the picoengine is not being clocked, then its power consumption is reduced. In another example, the PE power enable signal causes its corresponding picoengine to be disabled by freezing data going through the data path of the picoengine. This also causes the power consumption of the picoengine to be reduced because circuit nodes in the data path of the picoengine do not switch.

In addition to outputting PE power enable signals 31, the LUT circuit 10 also outputs memory power enable signals 32. In the present example, there are twelve of these signals, each being communicated across a dedicated conductor to the corresponding memory in picoengine pool 9. The twelve conductors that carry the twelve memory power enable signals are identified by reference numeral 33. If an assigning sequence does not use particular picoengines, then it is possible that one or more of the memories in the picoengine pool will not be accessed by any picoengine. Whether a particular memory will be accessed can be determined from the configuration information. LUT circuit 10 therefore outputs the memory power enable signals 32 to the memories in the picoengine pool so that any memory that is not used (given the particular assigning sequence being used) will be disabled. In one example, a memory power enable signal can disable its corresponding memory by reducing the voltage of the supply voltage supplied to the memory. In another example, a memory power enable signal can disable its corresponding memory by turning off sense amplifiers in the memory. The LUT circuit 10 can be implemented in any suitable way known in the art for performing the translation function of a look up table or decoder such as, for example, an amount of combinatorial logic or a memory.

Figure 3:
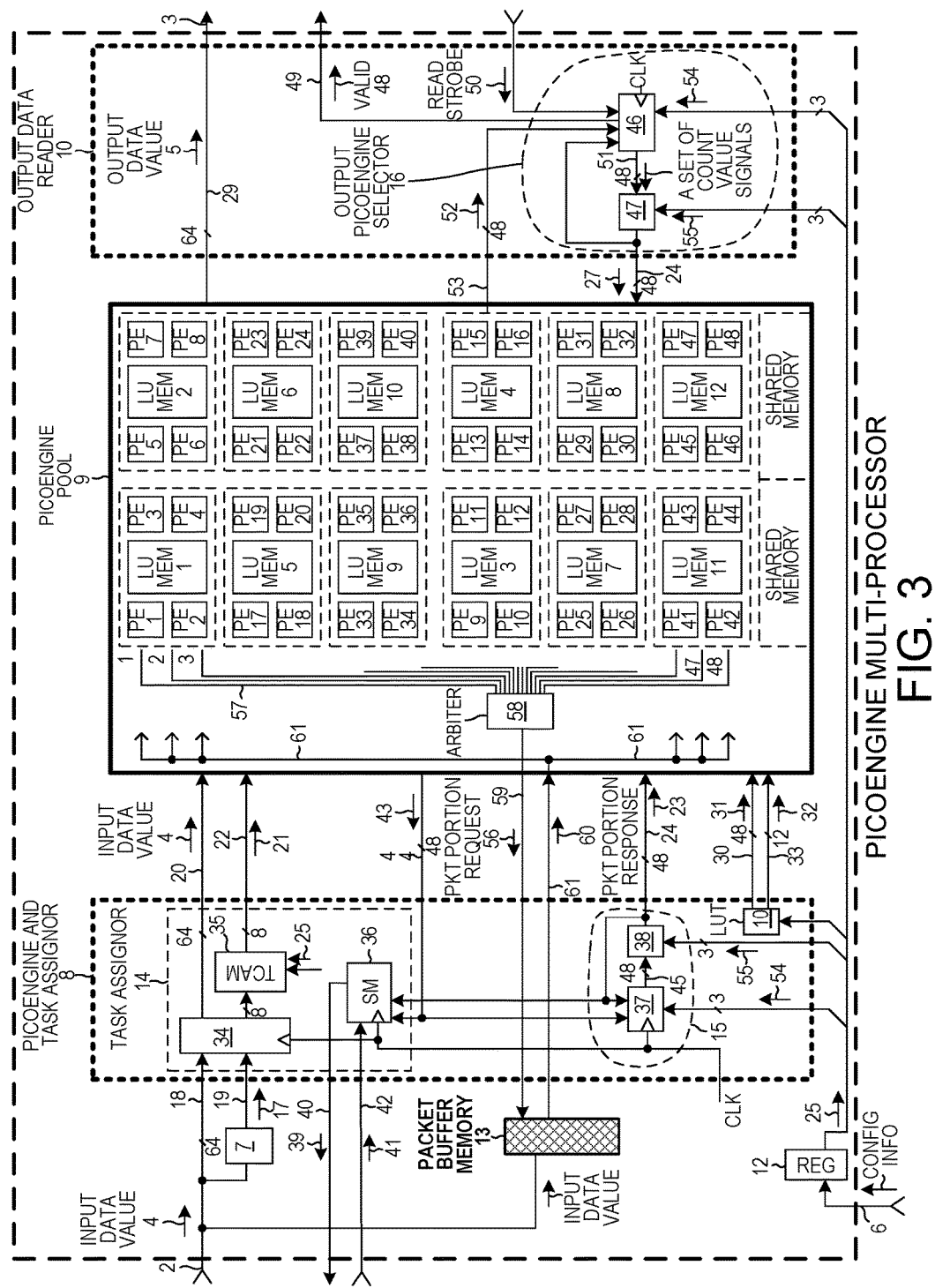
FIG. 3 is a still more detailed block signal diagram of the picoengine multi-processor of FIG. 1.

FIG. 3 is a still more detailed diagram of PEMP 1 of FIGS. 1 and 2. Task assignor 14 includes a register 34, a TCAM (Tertiary Content Addressable Memory) 35, and a state machine 36. Input picoengine selector 15 includes an incrementor 37 and a translator 38. State machine 36 monitors register 34. If register 34 is free and does not contain an input data value that has not been read into an assigned picoengine, then the state machine 36 outputs a valid signal 39 on conductor 40. Another entity (not shown) external to the picoengine multi-processor monitors the valid signal 39. If the picoengine multi-processor 1 is indicated as being available for receiving an input data value due to the valid signal 39 being asserted, then the external entity supplies an input data value onto input port 2 and asserts the strobe signal 41 on conductor 42 and clocks the input data value and the associated characterization value into register 34. The characterization value is then available on the outputs of register 34, and is supplied onto inputs of the TCAM 35. For each characterization value, the TCAM 35 outputs a task assignment. The content of the TCAM is loaded beforehand via the configuration port 6 and the configuration register 12. The task assignment output by the TCAM 35 is supplied via conductors 22 to the picoengine pool 9. At this point, the input data value is being supplied to the picoengine pool 9 via conductors 20 and the associated task assignment is also being supplied to the picoengine pool 9 via conductors 22.

Meanwhile, the translator 38 is outputting PE select signals 23 that identify the next picoengine to be selected. There are forty-eight such PE select signals, one of which is supplied to each of the forty-eight picoengines. Each picoengine outputs a "PE has read the data" signal back to the picoengine and task assignor 8. There are forty-eight "PE has read the data" signals 43 supplied back via conductors 44. When the selected picoengine is ready to receive a task, it clocks in the input data value and the task assignment and asserts its "PE has read the data" signal. State machine 36 uses this information to determine that register 34 is then free and available to receive the next input data value. The incrementor 37 of the input picoengine selector 53 uses this information as a prompt to increment. The incrementor 37 then increments once, thereby outputting the next "set" of count value signals on conductors 45. In the present example, the incrementor 37 increments by changing the "set" of count value signals. Each such "set" is a set of forty-eight signals, one and only one of which is asserted at a given time. One such "set" is a count. For each different "set", a different one of the forty-eight signals is asserted. As the incrementor increments, the one of the forty-eight signals that is asserted changes. The translator 38 is an amount of combinatorial logic that receives the "sets" of count value signals from the incrementor 37 and translates each such set into a corresponding set of forty-eight PE select signals. When the previously selected picoengine (as indicated by the PE select signals 23) indicates that it has read the input data value and the associated task assignment (by asserting its "PE has read the data" signal), then the incrementor 37 increments so that the PE select signals 23 will change to select the next picoengine in the sequence. In this way picoengines are assigned tasks of processing successively received input data values. After a picoengine has read in an input data value and its associated task assignment, the incrementor is incremented once to select the next picoengine in the sequence in anticipation of assigning that next picoengine the next input data value and the next task assignment.

The output data reader 11 operates by reading the output data values from picoengines in the picoengine pool 9 in the same sequence as was used to assign tasks to the picoengines of the picoengine pool 9. The output picoengine selector 16 includes an incrementor 46 and a translator 47. An entity (not shown) external to the picoengine multi-processor 1 reads output data values from the PEMP 1. If an output data value is available on output port 3 for being read by the external entity, then the valid signal 48 on conductor 49 is asserted. The external entity, in response, asserts the read strobe signal 50 and latches in the output data value. The incrementor 46 responds to the asserted strobe signal by incrementing once, thereby outputting the next "set" of count value signals in the sequence. This next "set" of count values signals is supplied to the translator 47 via conductors 51. The incrementor 46 outputs "sets" of count value signals in the same way described above that incrementor 37 outputs "set" of count value signals. There are forty-eight such signals, only one of which is asserted at a given time. As the incrementor increments, the one of the signal that is asserted changes. Translator 47 receives the next "set" of count value signals and translates this next set of count value signals into a corresponding next set of PE select signals 27. The next set of PE select signals 27 is communicated to the picoengine pool 9 via conductors 24 so that the next picoengine in the sequence is selected. The selected picoengine then indicates that is has data to be read by asserting its "PE has data to be read" signal back to the incrementor 46. There are forty-eight "PE has data to be read" signals 52 and are communicated back to the incrementor 46 via conductors 53. When the incrementor 46 receives notification that the selected picoengine has data to be read, it then asserts the valid signal 48 once more so the external entity can read this next output data value from output port 3. This process of reading picoengines in sequence is repeated using the same sequence that as used to assign the picoengines tasks.

In the example described above, the incrementors 37 and 46 increment forty-eight times through forty-eight different "sets" of count values. After forty-eight increments, the incrementors roll over in their sequences. This is, however, just an example. The incrementors 37 and 46 are programmable to roll over in their sequences after having output a selectable count number 54 of different sets of count values. This count number 54 is supplied to the incrementors 37 and 46 by three bits of the configuration information 25. For example, even though there are forty-eight picoengines in the picoengine pool, the incrementors 37 and 46 may be programmed only to increment twenty-four times before they roll over in their counts. In such an example, twenty-four of the picoengines will be assigned tasks over and over again in sequence, whereas the other twenty-four of the picoengines will not be used at all. Picoengines that are not used are automatically disabled by LUT circuit 10. Similarly, any associated memories that are not used are automatically disabled by LUT circuit 10. As the workload demanded of the picoengine pool 9 goes up and down as PEMP 1 is used, the count number 54 can be dynamically changed on-the-fly to adjust the number of picoengines employed. If there is a greater workload then a larger number 54 may be set so that more picoengines will be employed, whereas if there is a smaller workload then a smaller count number 54 may be set so that fewer picoengines will be employed. Even if the workload of PEMP 1 is stable and does not change, the number of picoengines employed may nevertheless be adjusted to achieve a different power consumption versus latency tradeoff. Depending on how the instructions executed by the picoengines are written, a smaller number of picoengines may be able to handle the workload thereby using fewer memory resources at the expense of higher processing latency while achieving lower power consumption. A larger number of picoengines may handle the same workload using more memory resources at the expense of higher power consumption while achieving lower processing latencies. The count number 54 can therefore be adjusted to change the power consumption versus latency tradeoff. If the count number 54 is changed on-the-fly while the picoengine multi-processor 1 is in operation, then an incrementor continues to count up using its last count number until it rolls over, and only then does the incrementor use the new count number.

In addition to changing to a new count number 54 at the time of incrementor roll over, a new sequence can also be put into use at the time of incrementor roll over. The sequence employed is determined by the translation done by the translators 38 and 47. In the present example, one of six translations is employed at a given time, with the particular translation that is employed being determined by a three-bit sequence number 55. The three-bit sequence number 55 is supplied to the translators 38 and 47 by three bits of the configuration information 25.

In addition, as described below in further detail, a picoengine in the picoengine pool 9 can send a packet portion request 56 to the packet buffer memory 13. Consider here the case where such a packet portion request is sent from the first picoengine processor PE1 to the packet buffer memory. The packet portion request 56 is communicated through an arbiter within the picoengine processor PE1 itself, out of the picoengine processor and across a set of conductors 57, through an arbiter 58, and across another set of conductors 59, to the packet buffer memory 13. As explained in further detail below, a packet portion request in this example includes: 1) identification information that identifies an amount of the packet data stored in the packet buffer memory (for example, a starting byte number and a number of bytes), 2) a 5-bit identifier that identifies the picoengine processor that issued the packet portion request, and 3) a 2-bit identifier that identifies the slice of the intelligent packet data register file that issued the packet portion request. In response to a packet portion request, the packet buffer memory 13 sends back to the requesting picoengine processor information 60 on conductors 61. In this example, the information 60 includes: 1) the requested data (the requested "packet portion"), 2) a one-bit valid flag, 3) the 5-bit identifier that identifies the picoengine processor to which the data is destined, and 4) the 2-bit identifier that identifies the slice of the intelligent packet data register file to which the data is destined. This information 60 supplied in parallel at the same time to all the picoengine processors of the pool via conductors 61, but only the appropriate one of the picoengine processors latches in the information from the conductors 61. The packet buffer memory 13 stores the various bytes of the packet data in byte-ordered fashion in accordance with their respective byte numbers, so when the packet buffer memory 13 receives a packet portion request setting forth a number of bytes to return starting at a given starting byte number, the packet buffer memory 13 can read the indicated bytes and return the requested data.

In this example, there is one and only one packet buffer memory 13 to which the picoengine processors of the pool 9 can send requests. This packet buffer memory 13 typically is storing 256 bytes (16 bytes of metadata and 240 bytes of packet data) for each packet being processed by the picoengine multi-processor, and a different one of the picoengine processors of the pool is processing each corresponding different packet, so each active picoengine processor can access its corresponding 256 bytes in the packet buffer memory. As the picoengine multi-processor operates, the number of picoengines that are active may increase and decrease with changing throughput requirements.

Figure 4:
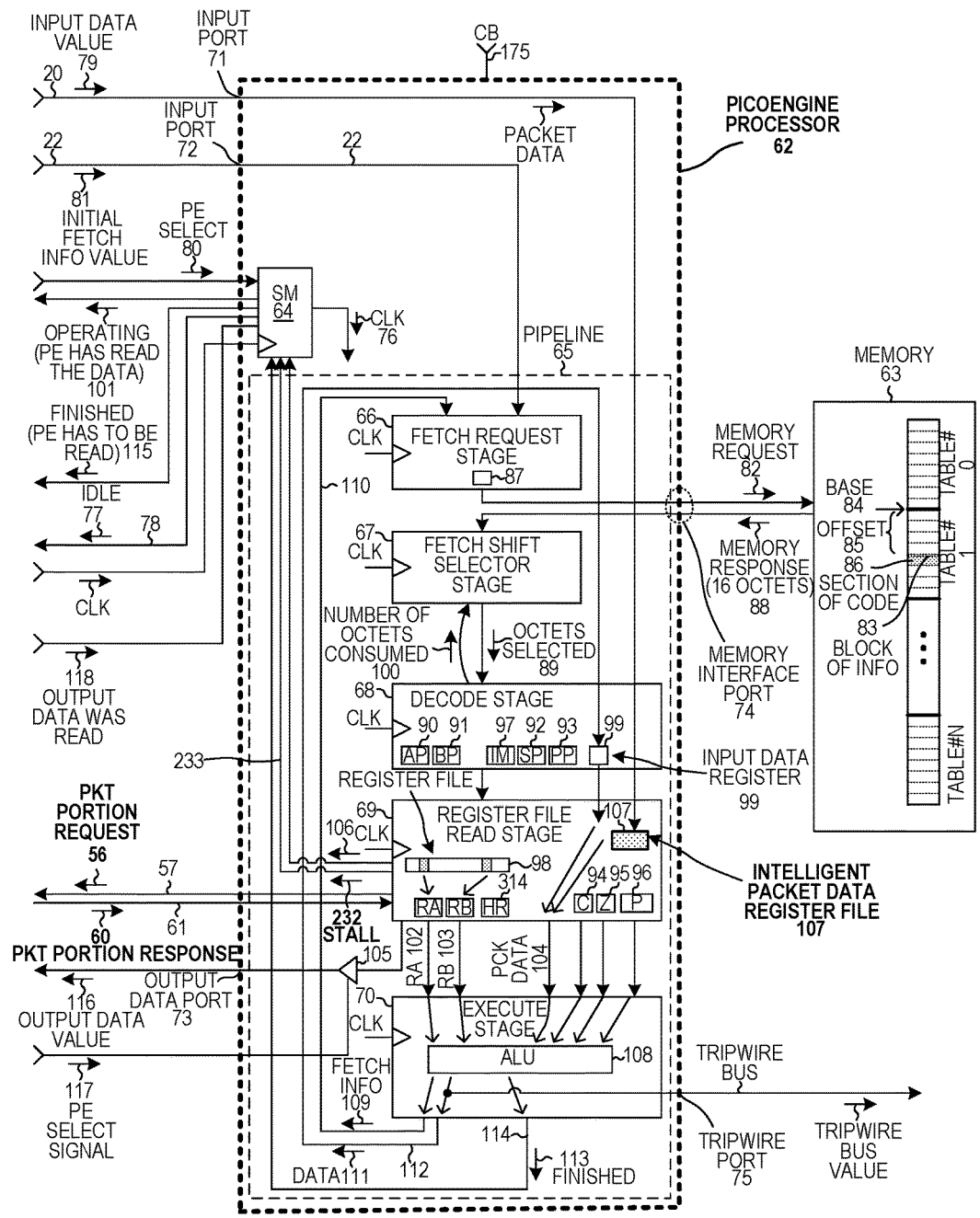
FIG. 4 is a block signal of one of the picoengine processors of the picoengine multi-processor of FIG. 1.
Figure 23:
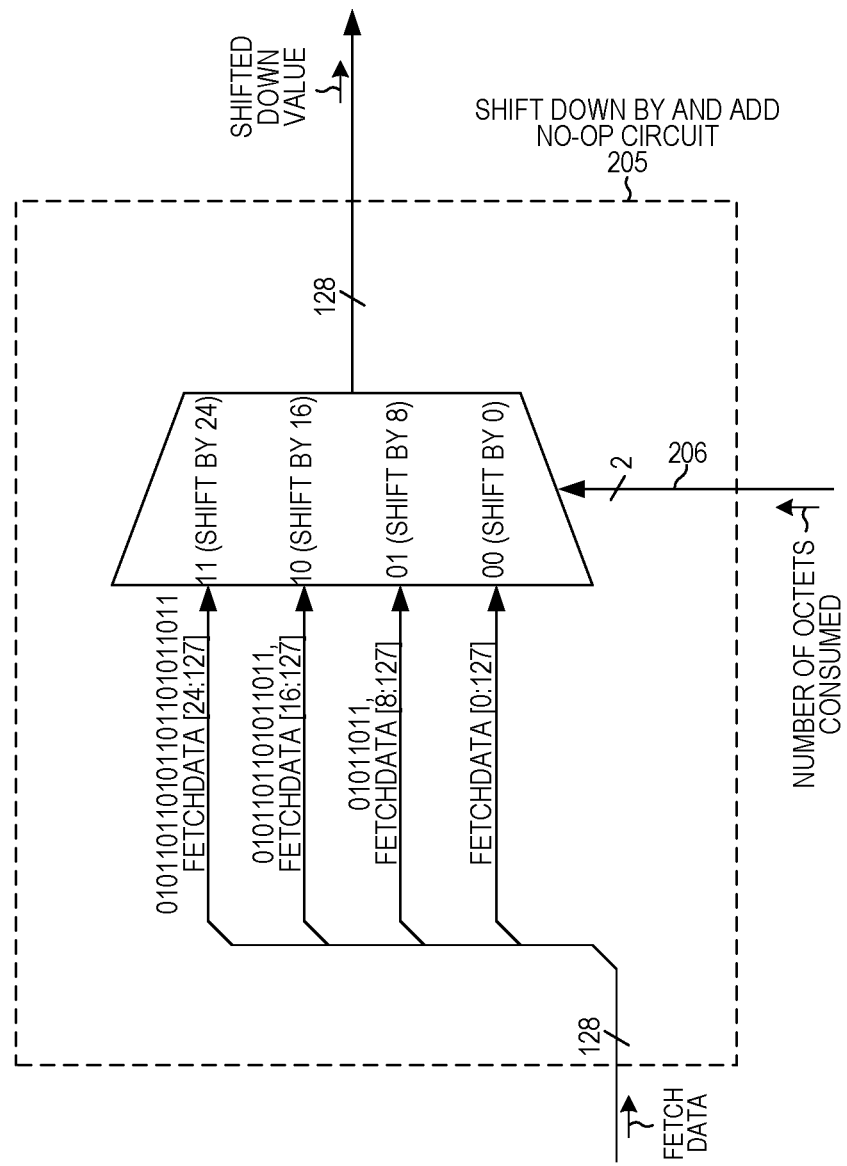
FIG. 23 is a more detailed diagram of shifter 205.

FIG. 4 shows one of the processors 62 of the pool 9 of FIG. 3 in further detail, and also shows an associated memory 63 of the pool. The memory 63 stores programs of instructions that are fetched and executed by processor 62. The memory 63 is one of the local memories or shared memories that are illustrated in FIG. 23 to be part of the pool 9. The processor 62 is a pipelined run-to-completion processor that includes a clock control state machine 64 and a pipeline 65. The pipeline 65 includes a fetch request stage 66, a fetch shift selector stage 67, a decode stage 68, a register file read stage 69, and an execute stage 70. The processor 62 receives input data values via input port 71, and initial fetch information values via input port 72. An initial fetch information value includes a task assignment and a set of flags values. The value of a particular flag indicates whether the input data value has a corresponding particular characteristic. If, for example, the input data value is packet data of an IPv4 network packet, then this characteristic is indicated by the assertion of an IPv4 flag (the IPv4 flag is set). There are many flags in an initial fetch information value, with each different flag indicating whether the corresponding input data value has a corresponding different characteristic.

The processor 62 outputs output data via output port 73, interfaces to memory 63 via a memory interface port 74, and outputs tripwire data via a tripwire port 75. The processor 62 does not fetch instructions through either of the input port 71 or the output data port 73. The processor 62 uses its memory interface port 74 to fetch instructions from memory 63. The processor 62 also does not have the capability and circuitry to write anything into any memory from which the processor fetches instructions, and the memory interface port 74 is not usable to write data into any memory. This allows the processor to be made even smaller. Due to its novel architecture, the processor is implemented in one embodiment in about ten thousand equivalent gates. The processor is therefore very small and is also referred to as a "picoengine". The processor has no instruction counter and only fetches instructions either: as a result of being prompted from the outside by an incoming input data value on port 71 and/or an incoming initial fetch information value on port 72, or as a result of execution of a fetch instruction. Due to the lack of an instruction counter and the associated control circuitry which can be substantial, the processor can be realized in a small amount of integrated circuit area.

Figure 20:
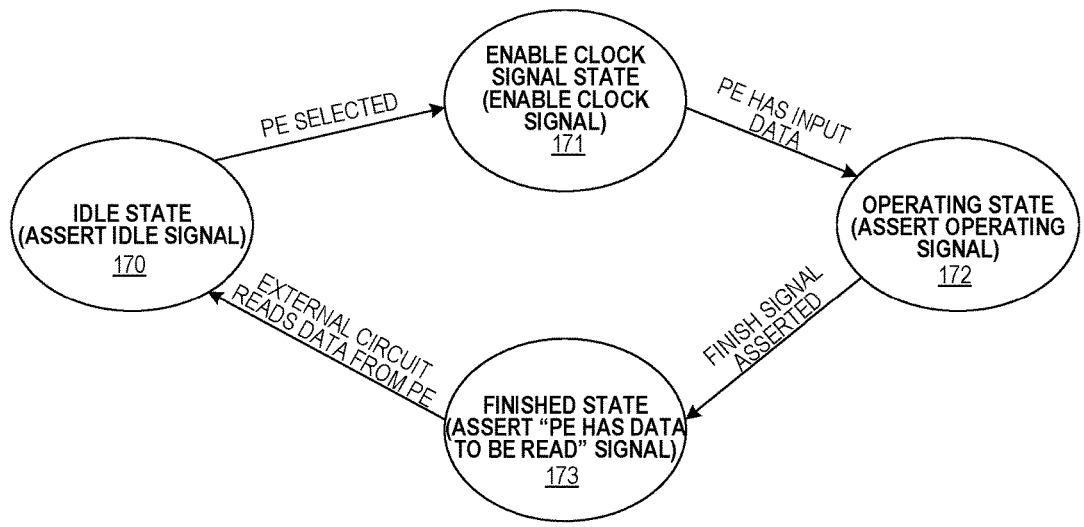
FIG. 20 is a state diagram for the clock control state machine of the picoengine processor of FIG. 3.

Initially, the state machine 64 is in the idle state 170 (see that state diagram of FIG. 20). The pipeline 65 is clocked by the clock signal CLK 76. In the idle state, the state machine disables the clock signal CLK from clocking the pipeline. The pipeline is therefore not being clocked, and power consumption of the processor is reduced. In the idle state, the state machine 64 also outputs the idle signal 77 via conductor 78. If the processor is idle, then the input data value 20 on the input port 71 and the associated initial fetch information value 81 on input port 72 as supplied to the processor 62 by the task assignor 8 of FIG. 3 can be received into the processor. To initiate this, the task assignor 8 of FIG. 3 asserts the appropriate PE select signal 80 (also referred to as a "start" signal) for the processor 62. This PE select signal 80 is received by the processor 62 on one of the PE select signal conductors 24 of FIG. 3. The input port 72 in this case is the set of conductors 20 of FIG. 3. The asserting of the PE select signal 80 informs the processor 62 that it can read the input data value 79 and the associated initial fetch information value 81. In response to the assertion of the PE select signal, the state machine 64 transitions to the enable clock signal state 171 (see the state diagram of FIG. 20).

The transition of the state machine 64 to the enable clock signal state 171 enables the pipeline by supplying the clock signal CLK 76 to the pipeline. The fetch request stage 66 generates memory requests that are supplied to the memory 63 via memory interface port 74. The fetch request stage can only output a memory request in response to either: 1) an incoming input data value and/or an incoming initial fetch information value, or 2) a fetch information value supplied to the fetch request stage as a result of execution by the pipeline of a fetch instruction. In the present example, both an incoming input data value is being supplied to the pipeline as well as an associated initial fetch information value. The incoming input data value 71 and/or initial fetch information value 81 prompts the pipeline to issue a memory request 82. The memory request 82 is communicated to the memory 63. As explained in further detail below, the memory request 82 is a request to read one 128-bit word 83 from the memory, where the address of the 128-bit word is given by a base address value 84 and an offset value 85. The 128-bit word 83 is located at the beginning of a section 86 of code. One such 128-bit word is also referred to here as a "block of information". The memory 63 is organized as a set of uniquely addressable 128-bit words. The base address value identifies the beginning of a table, TABLE#1 in this case, of code. The offset value identifies an offset from the base address 84 at the beginning of the table to the beginning of the section 86 of code. The memory 63 stores many such tables of code. The tables in FIG. 4 are denoted TABLE#0, TABLE#1, to TABLE#N.

In one specific example, the particular section 86 of code that the processor is prompted to fetch within table TABLE#1 depends on the initial fetch information value 81. The particular table as well is determined by the initial fetch information value 81. The initial fetch information value 81 includes a table number value. The fetch request stage 66 includes a table number to base address lookup circuit 87. The table number value is supplied to the lookup table circuit 87, and the lookup table circuit 87 outputs the base address value for the table. The base address value is then incorporated into the actual memory request 82.

The memory 63 responds by returning to the processor 62 a memory response 88. The memory response 88 includes one 128-bit block of information at the beginning of the identified section 86 of code. The 128-bit block of information 83 contains sixteen octets. The 128-bit block of information 83 includes a plurality of instructions, where an instruction can involve one, two or three octets, depending on the type of instruction. The number of instructions in a 128-bit block is therefore variable. The 128-bit block of information 83 is received by the fetch shift selector stage 67. The fetch shift selector stage 67 stores the 128-bit block of information, and then outputs three octets to the decode stage 68, where the particular octets output include the next instruction to be consumed next by the pipeline. Immediately after the fetch of the 128-bit block 83, it is the first, second and third octets of the 128-bit block that are output from the fetch shift selector stage 67.

The decode stage 68 receives the selected octets 89, and decodes the instruction. Based on the instruction, the decode stage loads an A register pointer AP 90, a B register pointer BP 91, a carry flag bit C 94, a zero flag bit Z 95, a stack pointer SP 92, a packet pointer PP 93, predicate bits P 96, and an immediate data register IM 97. The A register pointer AP 90 identifies one register (8-bit portion) of a register file 98 in the register file read stage 69. This identified 8-bit portion contains the value of the A register for the instruction to be executed. The B register pointer BP 91 identifies another register (8-bit portion) of the register file 98 that contains the value of a B register for the instruction to be executed. The stack pointer SP 92 identifies one register (8-bit portion) of the register file 98 that is the top of the stack. The 8-bit portions of the register file are usable as a stack, and there are instructions in the instruction set of the processor that use the stack.

The packet pointer PP 93 identifies one bit in the input data register 99, where the bit is the first bit of a multi-bit value that may be used in the instruction to be executed. As described in further detail below, the packet pointer PP stores a byte number that points to a particular byte in the overall larger amount of packet data that is stored in the packet buffer memory 13 of FIG. 3, as well as to a subset of that data that is stored in the input data register 99. As described in further detail below, the register file read stage 69 includes a smaller "intelligent packet data register file" 107 that includes three slice portions, where each slice portion stores a part of the input data value referred to here as a "packet portion". Such a packet portion is a portion of the larger amount of packet data stored in the packet buffer memory 13 of FIG. 3.

The predicate bits P 96 are three-bits that may be used by an instruction to specify a predicate condition function. In addition to determining these pointer values, the decode stage 68 sends a "number of octets consumed signal" 100 back to the fetch shift selector stage 67. The number of octets consumed depends on the instruction just consumed. If the instruction just consumed involves only one octet, then the decode stage 68 informs the fetch shift selector stage 67 to shift the bits the fetch shift selector stage outputs by one octet. If the instruction just consumed involves two octets, then the decode stage 68 informs the fetch shift selector stage 67 to shift the bits the fetch shift selector stage outputs by two octets. If the instruction just consumed involves three octets, then the decode stage 68 informs the fetch shift selector stage 67 to shift the bits the fetch shift selector stage outputs by three octets. Which octets of the block of information 83 that are output by the fetch shift selector stage 67 are therefore determined by the decode stage 68 using the number of octets consumed signal 100.

When the input data value 79 is stored into the input data register 99, a signal 106 is sent back to the state machine 64, thereby causing the state machine 64 to transition from the enable clock signal state 171 to the operating state 172 (see the state diagram of FIG. 20). The state machine 64 signals the external circuit that the processor circuit 2 has received the input data value 79 by outputting an operating signal 101. The task assignor 8 of FIG. 3 can then stop driving input data value 79 onto the input port 71.

The register file read stage 69 uses the pointer values output from the decode stage to identify the portions of the register file 98 that store the A register value RA 102, and store the B register value RB 103. The register file read stage 69 uses the packet pointer value 93 from the decode stage to identify the portion of the input data register 99 that stores the PCK data value 104 to be used by the instruction. The contents of the register file 98 are output from the register file read stage 69 to the output buffers 105, but the output buffers 105 are disabled. The contents of the register file 98 are therefore not driven onto the output data port 73.

The execute stage 70 receives the RA value 102 (the contents of the A register), the RB value 103 (the contents of the B register) and the PCK data value 104 from the register file read stage 69. These values are inputs to an ALU 108 (Arithmetic Logic Unit) in the execute stage. The instruction operation to be performed, using these values, is determined by control signals (not shown) received from the decode stage 68, where the instruction operation is determined by the opcode of the instruction. The instruction set of the processor includes several different types of instructions including: ALU instructions, memory access instructions for data, instruction fetch instructions, and processor control instructions. Some of the instructions use the packet pointer (the value stored in PP 93) and a value stored in the "intelligent packet data register file" 107 so that the instruction can obtain and use a part or parts of the input data value 79. After an instruction has been consumed by the decode stage of the pipeline, the next instruction in the fetched block of information is supplied to the decode stage. The instructions of the fetched block of instructions are supplied to the decoder and are decoded one by one.

If the execute stage is executing a fetch instruction, then the execute stage supplies fetch information 109 back to the fetch request stage 66 via conductors 110. The execute stage also supplies associated data 111 via conductors 112. In the same way that an externally prompted fetch is prompted by information received on ports 71 and 72, so too is an internally prompted fetch from the execute stage 70 prompted by fetch information 109 on conductors 110 and data 111 on conductors 112.

As stated above, once the pipeline is operating it does not and cannot fetch instructions unless either: 1) it is prompted to by the receipt of another input data value (and associated initial fetch information value) or, 2) it is prompted to by execution of a fetch instruction. If the processor executes the last instruction of the fetched block of information and there is not a next instruction that has already been fetched, then the processor would hang. Accordingly, in the present example, the last instruction of the fetched block of information 83 is another fetch instruction. This last fetch instruction causes the processor to fetch the next 128-bit block of information from the same section 86 of code. The processor then continues on executing instructions from this second 128-bit block of information. The section 86 of code has a particular function. At the end of the code for performing this function is another fetch instruction, but this fetch instruction is an instruction to fetch the next 128-bit block of information from another table. In this way, the code executed by the processor is modular, with the code of one table causing a fetch into the code of another table, and so forth, from table to table. When fetching into the next table, the offset into the table is typically determined by a characteristic of the input data value 79, as recorded by flags in the initial fetch information value 81. When execution jumps from one table to the next, the particular section of code that is specifically tailored to data having a characteristic is vectored to (as opposed to vectoring to another section of the table whose code is not for data having the characteristic) due to the fetch instruction having access to the flags.

After the functions of the code have been carried out and execution of the code has traversed from table to table, a final "finished instruction" is executed. Execution of the finished instruction causes the execute stage 70 to assert a finished signal 113 on conductor 114. Asserting of the finished signal 113 causes the state machine 64 to transition from the operating state 172 to the finished state 173 (see the state diagram of FIG. 20). In the finished state, the state machine asserts a finished signal 115 that is output from the processor 62. The finished signal 115 as output from the processor is also referred to as the "PE has data to be read" signal. Assertion of the finished signal 115 indicates to the output data reader circuit 11 of FIG. 3 that the processor 62 has data to supply to the external circuit. In response to the assertion of the "PE has data to be read" signal 115, the output data reader circuit 11 enables the outputting of the data output value 116 onto output data port 73 by asserting a "PE select signal" 117. The PE select signal 117 is one of the signals on the conductors 24 of FIG. 3. Assertion of the PE select signal causes the output buffers 105 to be enabled. The buffers 105 then drive the contents of the register file 98 onto the output data port 73 and to the output data reader circuit 11 of FIG. 3. Execution of the finished instruction also causes the state machine 64 to stop the clock signal CLK 76 from being supplied to the pipeline 65. The pipeline therefore stops clocking, and power consumption is reduced.

While the PE select signal 117 is asserted and the output data value 116 is being driven onto the output data port 73, the output data reader circuit 11 of FIG. 3 receives the output data value 116 from the output data port 73. The output data reader circuit 11 then deasserts the PE select signal 116 thereby disabling driver 105, and asserts an "output data was read" signal 118. Assertion of the "output data was read signal" 118 causes the state machine 64 to transition to the idle state. In the idle state, the state machine asserts the idle signal 77. At this point, the pipeline is not being clocked, but it is ready to receive another input data value and another associated initial fetch information value.

Figure 5:
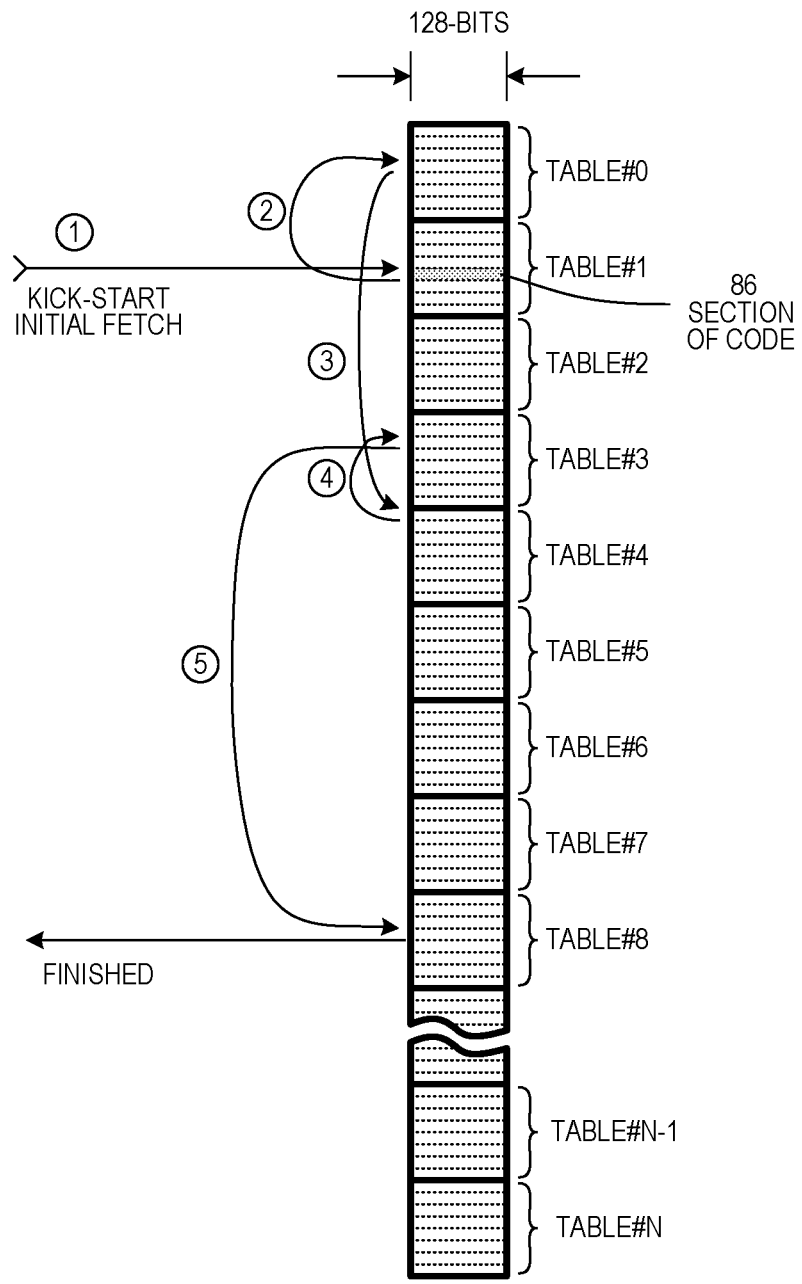
FIG. 5 is an illustration of the sections of code executed by the picoengine processor of FIG. 4.

FIG. 5 is a diagram of the program code stored in memory 63. The memory is organized as many uniquely addressable 128-bit blocks of information. There are many such 128-bit blocks of information in one section of code, and there are many sections of code in one table, and there are N tables stored in the memory. In the illustrated example, the initial fetch (the one initially prompted from outside the processor by incoming data) is identified by the circled numeral "1". The incoming initial fetch information causes the pipeline to start clocking. The resulting first fetch from memory 63 has a base address 84 that identifies the first word 83 (first 128-bit block) of TABLE#1. The table number given by the initial fetch information value 81 is translated by the lookup table circuit 87 into the base address value 84 that is then used in the memory request 82. The offset 85 from the beginning location of TABLE#1 identifies the beginning 128-bit block 83 of section 86 of code. This offset is specified by the initial fetch information. Once all the blocks of this section 86 of code have been executed, a fetch instruction causes code execution to jump to the fourth section of TABLE#0. This is identified in FIG. 5 by the circled numeral "2". After execution of this section of code, a fetch instruction causes code execution to jump to the first section of the code of TABLE#4. This is identified in FIG. 5 by the circled numeral "3". The instruction fetches that causes the fourth and fifth jumps are identified in FIG. 5 by the circled numerals "4" and "5". At the end of the fourth section of code of TABLE#8 is a "finished" instruction. This finished instruction causes the pipeline to stop clocking, and causes output data reader circuit 11 of FIG. 3 to be signaled that the processor 62 has an output data value to be read on output data port 73.

Each section of code is typically an amount of code that is specialized to do a particular discrete task on input data having a particular characteristic or characteristics. In one simplified illustrative example, a first section of code does VLAN and MAC address processing, a second section of code does IP header analysis processor, a third section of code does tunnel decapsulation processing, and a fourth section of code does inner header processing. Execution of a fetch instruction at the end of the first section references an IP header version flag (a flag in the initial fetch information value 81 that indicates whether packet data is IPv4 or IPv6), and as a result of this flag fetches code at the beginning of the second section. Execution of a fetch instruction at the end of the second section references a header value in the input data value 79 (the header value indicates whether the packet is a tunnel packet, and if so what kind of tunnel), and as a result of this header value fetches code at the beginning of the third section. Execution of a fetch instruction at the end of the third section references a set of data values stored in memory 63 (the set of data values indicates whether the packet data is an ethernet frame or an IP packet), and as a result of this set of data values fetches code at the beginning of the fourth section. Another processor (a microengine (ME) processor not shown) preloads the set of data values into the memory 63 so that the set of data values is later usable by picoengine (PE) processor 62 executing a fetch instruction to determine which section of code to execute next. Memory 63, in addition to storing blocks of information of code, stores many such sets of data values.

Figure 6:
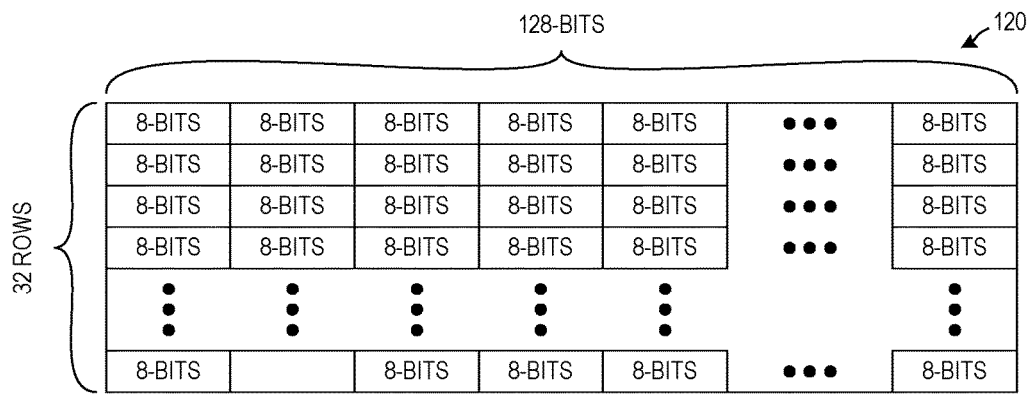
FIG. 6 is an illustration of one section of the code of FIG. 5.

FIG. 6 is a diagram of one section 120 of code. Each 128-bit block of information (one row in the diagram) includes 16 octets. In this example, there are thirty-two 128-bit blocks of information in the section 120.

Figure 7:
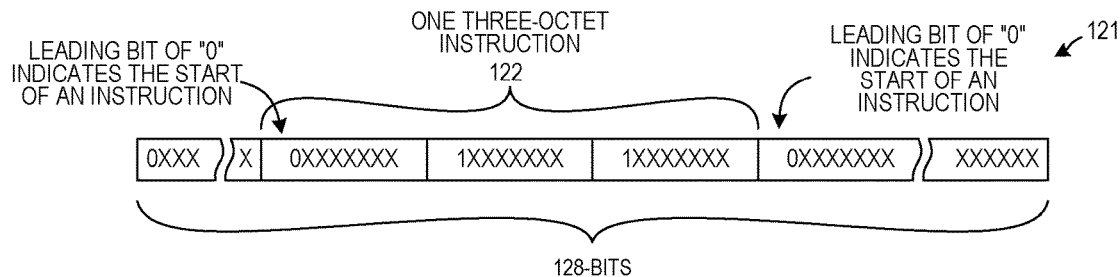
FIG. 7 is a diagram of one 128-bit block of information within the section of code of FIG. 6.

FIG. 7 is a diagram of one 128-bit block 121 of information, and one three-octet instruction 122 within the block 121. The first octet of each instruction starts with a "0" bit. The second octet of a multi-octet instruction starts with a "1" bit. The third octet of a three-octet instruction starts with a "1" bit. The decode stage 68 uses these leading bits of the octets to parse the octets of a block of information and to identify the boundaries between instructions.

Figure 8:
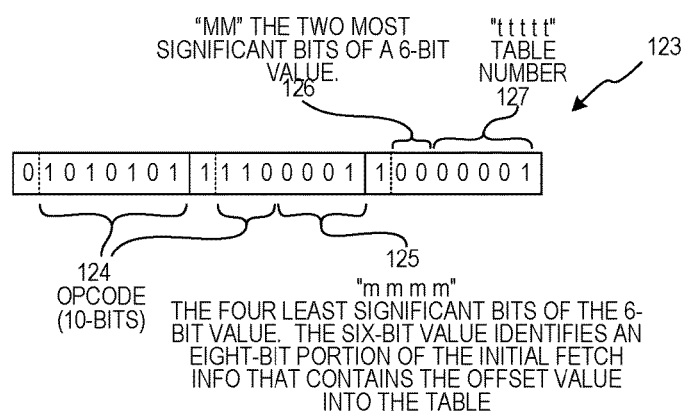
FIG. 8 is a diagram of a fetch instruction in which the offset value is a value in the initial fetch information value.

FIG. 8 is a diagram that illustrates a fetch instruction 123 where the offset value is a value in the initial fetch information value. The instruction is a three-octet instruction. The opcode 124 is ten bits. The four "mmmm" bits 125 and the two "MM" bits 126 together form a six-bit value, where this six-bit value identifies one eight-bit portion of the initial fetch information value that contains the offset value. Each eight-bit portion of the initial fetch information value is numbered, and the value "MMmmmm" is the number of one of these eight-bit portions. The five "ttttt" bits 127 indicate the table number. As mentioned above, in one example the table number is translated by the lookup table circuit 87 into the base address value where the table starts in memory 63.

FIG. 9 is a diagram that illustrates a fetch instruction 128 where the offset value is a value in the input data value. The instruction is a two-octet instruction. The opcode 129 is seven bits. The two "MM" bits 130 indicate the memory that contains the table. In the present example, memory 63 is identified by an "MM" value of "00". The five "ttttt" bits 131 indicate the table number. The packet pointer PP 93 identifies one of the eight-bit portions of the input data value, and this eight-bit portion is used as the offset value.

FIG. 10 is a diagram that illustrates a fetch instruction 132 where the offset value is in a specified register in the register file 98. The instruction is a three-octet instruction. The opcode 133 is ten bits long. The four "nnnn" bits 134 indicate the number of the register in the register file 98 that contains the offset value into the table. The two "MM" bits 135 indicate the memory that contains the table to be fetched from. The five "ttttt" bits 136 specify the table number.

FIG. 11 is a diagram that illustrates a fetch more instruction 137. This instruction is one octet in length, and only contains a seven-bit opcode 138. The instruction causes a fetch of the next 128-bit block of information that is located in the memory immediately after the last 128-bit block of information that was fetched. The memory from which the fetch is conducted is the same memory from which the last fetch was conducted.

FIG. 12 is a diagram of a two-octet conditional skip instruction 139 that explicitly specifies a skip count and a predicate function. The opcode 140 of skip instruction is "1110000". If a predicate condition as determined by the value of the predicate code field 141 is true (if the predicate condition is "satisfied"), then execution of a number of subsequent instructions (instructions that follow the skip instruction in the sequence of instructions fetched) specified by the 3-bit skip count field 142 are "skipped". Inclusion of such a skip instruction into a sequence of instructions generally does not affect or change the number or order or flow of instructions decoded by the decode stage 68 of the pipeline. The number and order and flow of instructions that are decoded by the decode stage 68 may be the same, regardless of whether the predicate condition is satisfied and a subsequent instruction or instructions are skipped, and regardless of whether the predicate instruction is not satisfied and a subsequent instruction or instructions are not skipped. Similarly, the fetching of instructions can be the same, regardless of whether the skip occurs, or not. If the predicate condition of the skip instruction is true and a subsequent instruction or instructions are skipped, however, then the execute stage 70 of the pipeline does not carry out the instruction operation of any skipped instruction. In addition, the skip instruction 139 includes a "flag don't touch" bit 143. If the "flag don't touch" bit 143 is set, then neither the skip instruction 139 nor any subsequent skipped instructions (skipped due to the skip instruction) are enabled to change the values of the carry bit C 94 and the zero bit Z 95. If the "flag don't touch" bit 143 is not set, on the other hand, then either the skip instruction 139 or any subsequent skipped instructions (skipped due to the skip instruction) can change the values of the carry bit C 94 and the zero bit Z 95.

FIG. 13 is a diagram that sets forth the predicate codes indicated by the three predicate bits.

FIG. 14 is a diagram that illustrates an efficient skip instruction 144. This instruction is one octet in length and includes a seven-bit opcode 145. Rather than there being a skip count filed, the opcode 145 itself is used as an indication that only the next one instruction will be skipped. There is another similar single-octet skip instruction whose opcode is used as an indication that the next two instructions will be skipped. Rather than the predicate code being explicitly specified by the instruction itself as in the instruction 139 of FIG. 12, in the case of the instruction 144 of FIG. 14 the 3-bit value of the predicate bits P 96 are used to specify the function of the C and Z flags that condition carrying out of the skip.

Figure 15:
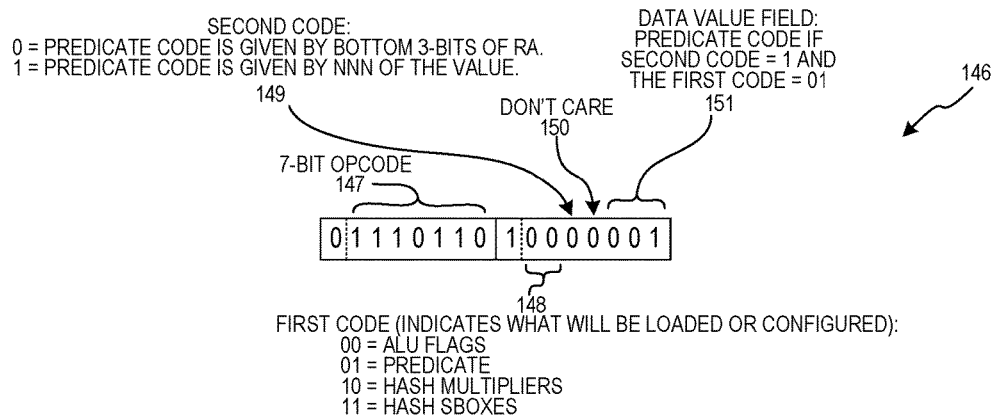
FIG. 15 is a diagram of a load register file read stage control register instruction.

FIG. 15 is a diagram that illustrates a load register file stage control register instruction 146. This instruction 146 is also referred to as a "set RF CSR" instruction. The instruction 146 includes a 7-bit opcode 147, a 2-bit first code field 148, a 1-bit second code field 149, a don't care bit 150, and a 3-bit data value field 151. The value of the 2-bit first code field 148 specifies a circuit or amount of circuitry that will be loaded or configured due to execution of the instruction 146. For example, if these two bits are "01", then execution of the instruction 146 will cause the predicate bits P 96 in the register file read stage to be loaded. If the value of the second code field 149 is "1" then the values of the data value field 151 of the instruction are the values that will be loaded into the predicate bits P 96, whereas if the value of the second code field 149 is "0" then the three least significant bits of the value RA of register A will be loaded into the predicate bits P 96.

Figure 16:
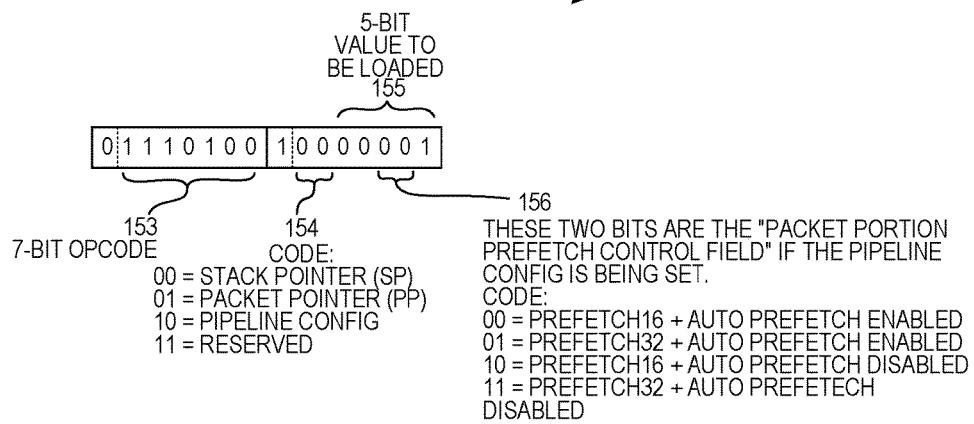
FIG. 16 is a diagram of a load decode stage control register instruction.

FIG. 16 is a diagram that illustrates a load decode stage control register instruction 152. The instruction includes two octets. The instruction 152 includes a 7-bit opcode 153, a 2-bit code 154, and a 5-bit value to be loaded 155. Two bits of the immediate register IM 97 in the decode stage 68 are a "packet portion prefetch control field" for the "intelligent packet data register file" 107. If the 2-bit code 154 is "10", then the two bits 156 are loaded into the two packet portion prefetch control bits in the register IM 97. The first of these two control bits is an automatic packet portion prefetch enable bit. The second of these two control bits is a prefetch window size control bit. If the first bit is cleared then automatic packet portion prefetching is enabled, whereas if the first bit is set then automatic packet portion prefetching is disabled. If the second bit is cleared then the size of the prefetch window is sixteen bytes, whereas if the second bit is set then the size of the prefetch window is thirty-two bytes. If the 2-bit code 154 is "01", then the packet pointer PP 93 in the decode stage 68 is loaded with the 5-bit value of specified by field 155 of the instruction 152. The packet pointer PP 93 is eight bits, so the leading three bits loaded are "000". For example, if the field 155 contained the value "11111", then an 8-bit value of "00011111" would be loaded into the packet pointer PP 93. This instruction 152 is one of several instructions whose execution can change the value stored in the packet pointer PP 93.

Figure 17:
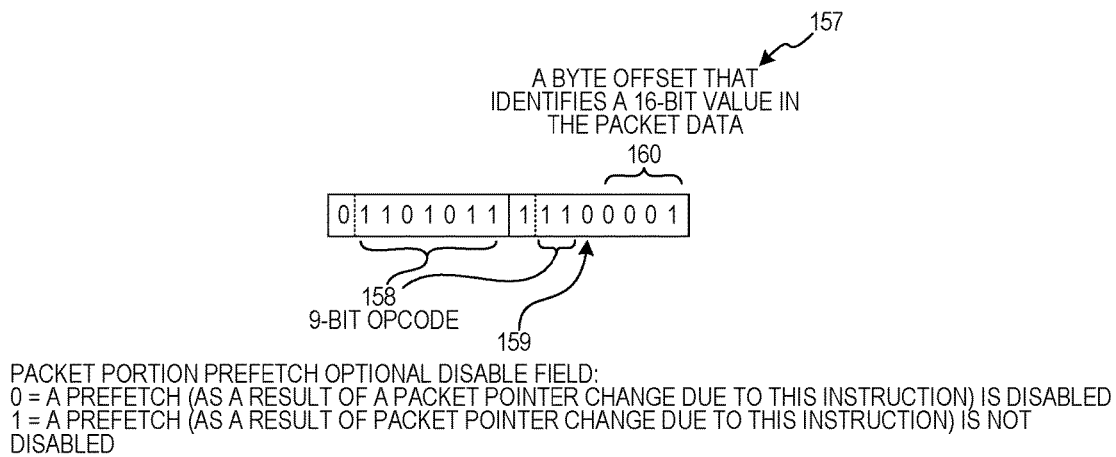
FIG. 17 is a diagram of a hash, move packet pointer, and packet data prefetch instruction.

FIG. 17 is a diagram that illustrates a hash, move packet pointer and packet portion prefetch instruction 157. The instruction includes a 9-bit opcode 158, a packet portion prefetch optional disabled field 159, and a field 160 that contains a 4-bit offset value. Execution of instruction 157 uses the 4-bit value of field 160 as a byte offset into the packet data to identify a 16-bit packet data value, where a preset hash function is then performed on this 16-bit packet data value. As set forth in U.S. patent application Ser. No. 14/448,906, entitled "Picoengine Having A Hash Generator With Remainder Input S-Box Nonlinearizing", filed Jul. 31, 2014, by Gavin J. Stark (the entire subject matter of which is expressly incorporated by reference herein), the hash function to be applied is preset beforehand using the "load register file read stage control register" instruction (see FIG. 15) to set particular hash control values that determine the hash function. Execution of the instruction 157 of FIG. 17 applies this preset hash function to the 16-bit packet data value (as identified by the instruction 157), and the resulting hash value is placed in the hash result register HR 314. When this hash operation is done, the packet pointer is changed so that it no longer points to the beginning of the 16-bit value, but rather so that it now points to the first byte of packet data immediately following the end of the 16-bit value. If bit 159 is set then whether or not the intelligent packet data register file 107 will be prompted by the change in the packet pointer to do a packet portion prefetch is unaffected by the instruction 157, whereas if bit 159 is cleared then execution of instruction 157 is disabled from triggering a packet portion prefetch (regardless of the value of the prefetch enable bit in register IM 97). Accordingly, if bit 159 is set, then packet portion prefetching can occur as a result of execution of the instruction 157 provided that the two "packet portion prefetch control" bits in the register IM 97 are set to allow such prefetching. For example, if the hash operation results in the packet pointer PP being moved to point to an amount of the packet data not then stored in the "intelligent packet data register file", then this changing of the packet pointer PP may trigger the intelligent packet data register file to read from the packet buffer memory 13 any bytes in the next prefetch window that the intelligent packet data register file is not currently storing. These bytes may be prefetched in this way, even though they may never be used in the execution of a subsequent instruction. Also, execution of the instruction 157 may result in the packet pointer PP being changed, but the amount of packet data pointed to by the new packet pointer value is nevertheless already stored in the intelligent packet data register file 107. In this situation, despite the packet pointer being changed and despite prefetching being enabled, no prefetching occurs.

Figure 18:
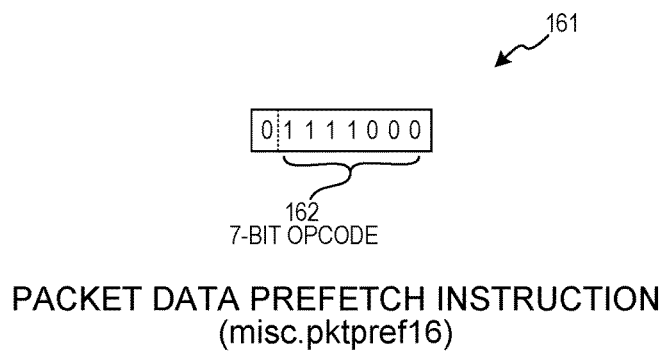
FIG. 18 is a diagram of a packet data prefetch instruction.

FIG. 18 is a diagram that illustrates a prefetch instruction 161. Execution of the instruction 161 prompts a packet portion prefetch (using a prefetch window size of sixteen bytes) without changing any register file values, and without performing any ALU operations in the execute stage. If prefetching is enabled, the intelligent packet data register file 107 uses the value of the packet pointer PP and the prefetch window size to determine a 16-byte wide prefetch window, and then determines whether the intelligent packet data register file is currently storing all the bytes of packet data in this prefetch window. If all the bytes are already stored in the intelligent packet data register file then no packet portion prefetching occurs, but if the intelligent packet data register file does not store at least some of the bytes in the prefetch window then one or more packet portion prefetches are initiated and performed to retrieve the missing bytes of packet data. There is a similar one-octet instruction that prompts a packet portion prefetch using a prefetch window size of thirty-two bytes.

Figure 19:
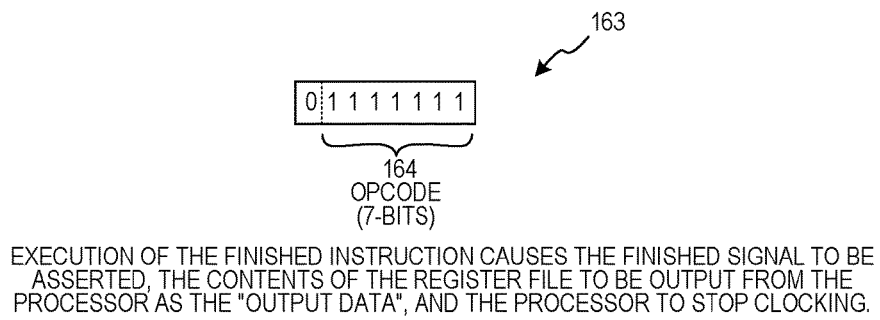
FIG. 19 is a diagram of a finished instruction.

FIG. 19 is a diagram that illustrates a finished instruction 163. This instruction is one octet in length and includes a seven-bit opcode 164. As mentioned above, execution of the finished instruction causes the pipeline to stop clocking, and causes the state machine 64 to transition to the finished state. In the finished state, the state machine 64 causes the processor 62 to assert the "PE has data to read" signal 115.

FIG. 20 is a state diagram of the state machine 64. The four states are the idle state 170, the enable clock signal state 171, the operating state 172, and the finished state 173. Assertion of the "PE select signal" 80 causes the state machine to transition from the idle state to the enable clock signal state. Assertion of the operating signal 101 (also called the "PE has read the data" signal) causes the state machine to transition from the enable clock signal state to the operating state. Assertion of the finished signal 113 from the execute stage causes the state machine to transition from the operating state to the finished state. Assertion of the "output data was read" signal 118 causes the state machine to transition from the finished state to the idle state.

Figure 21:
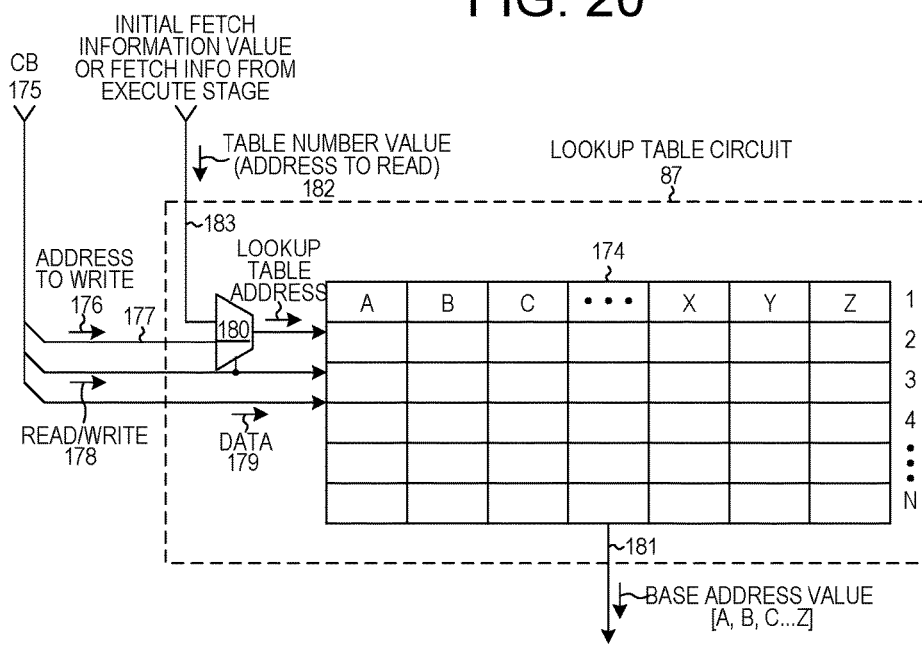
FIG. 21 is a simplified diagram of one possible implementation of the lookup table circuit within the fetch request stage of the picoengine processor of FIG. 3.
Figure 22A:
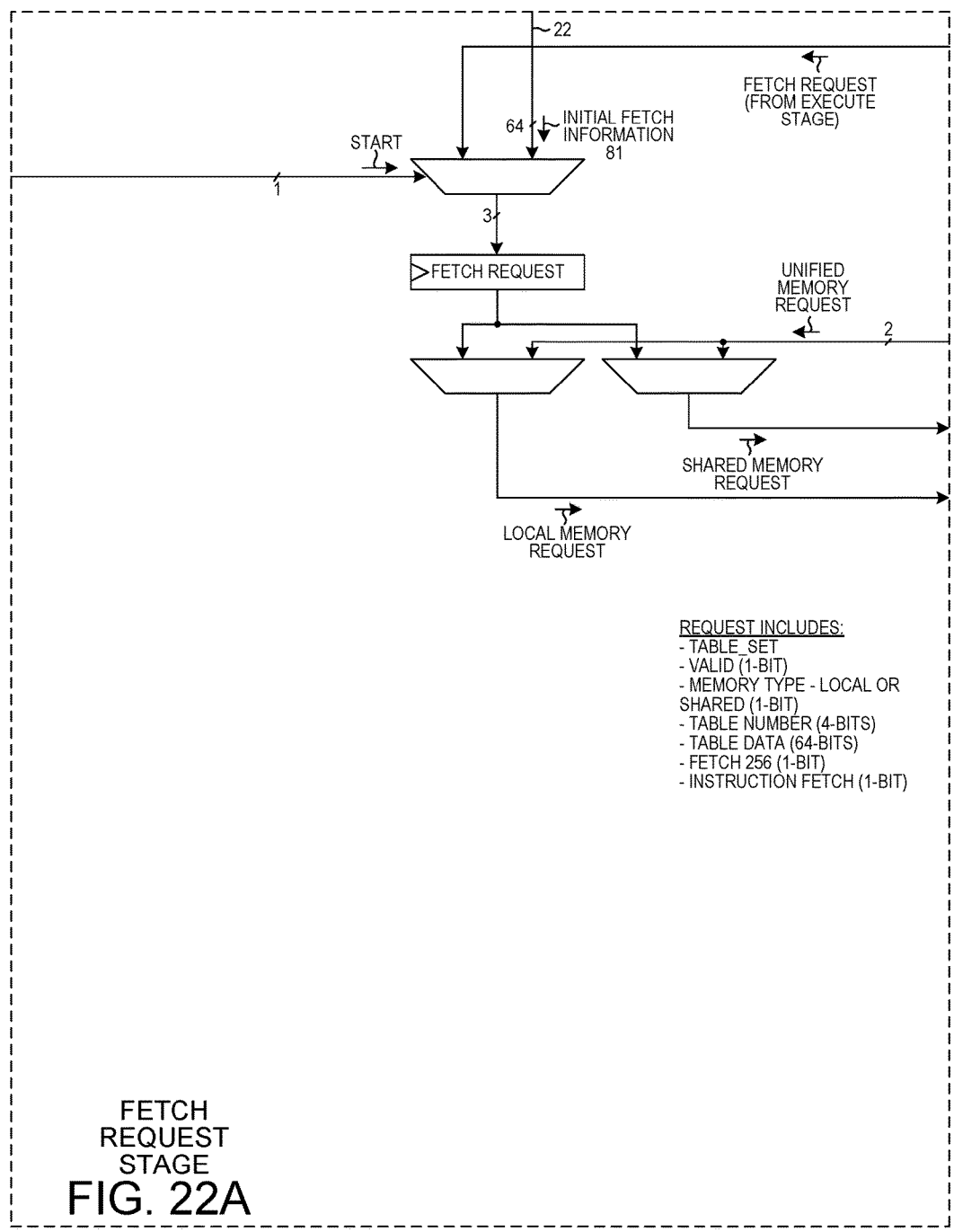
FIG. 22A is a part of a larger diagram of FIG. 22, where
Figure 22B:
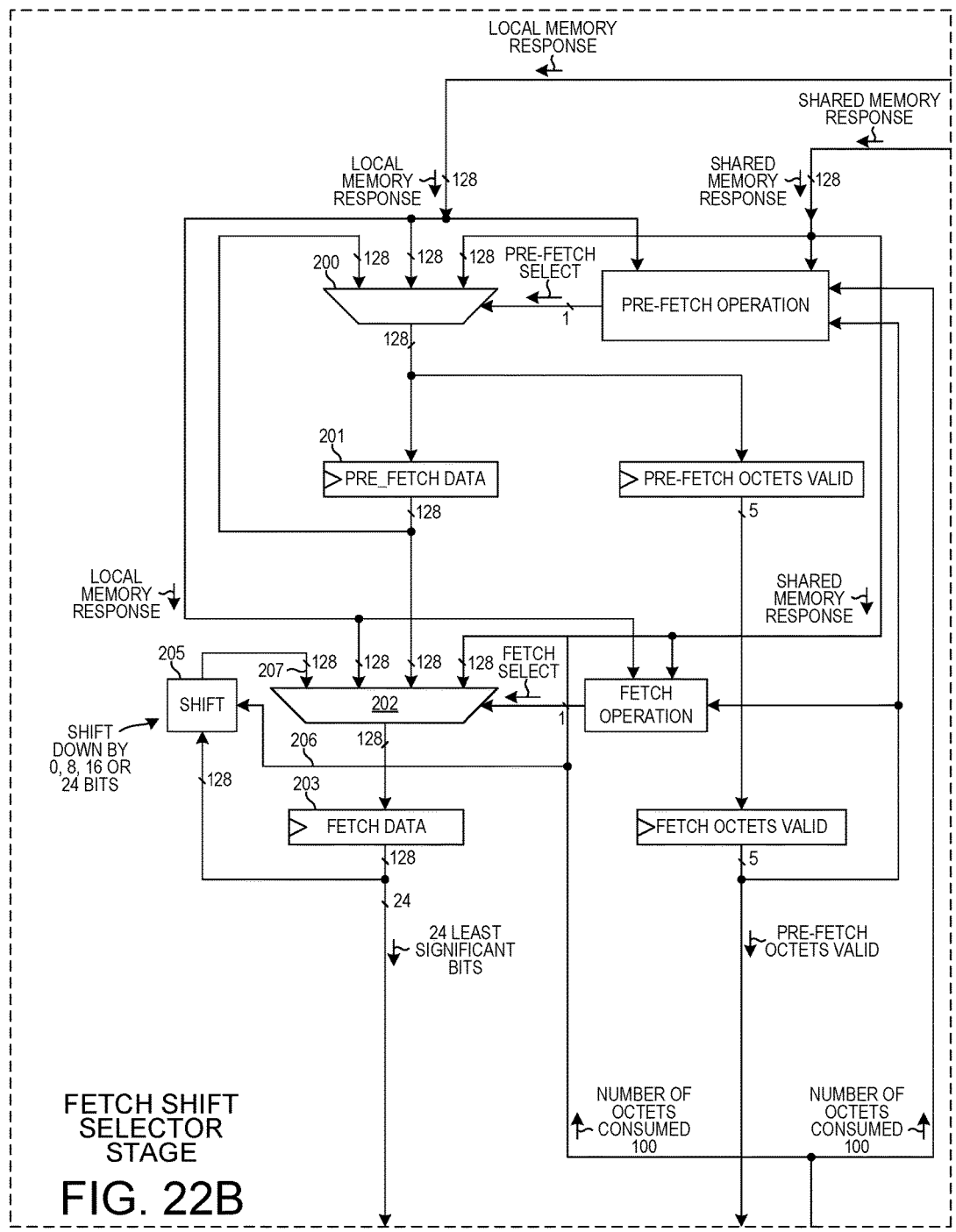
FIG. 22B is a part of the larger diagram of FIG. 22.
Figure 22D:
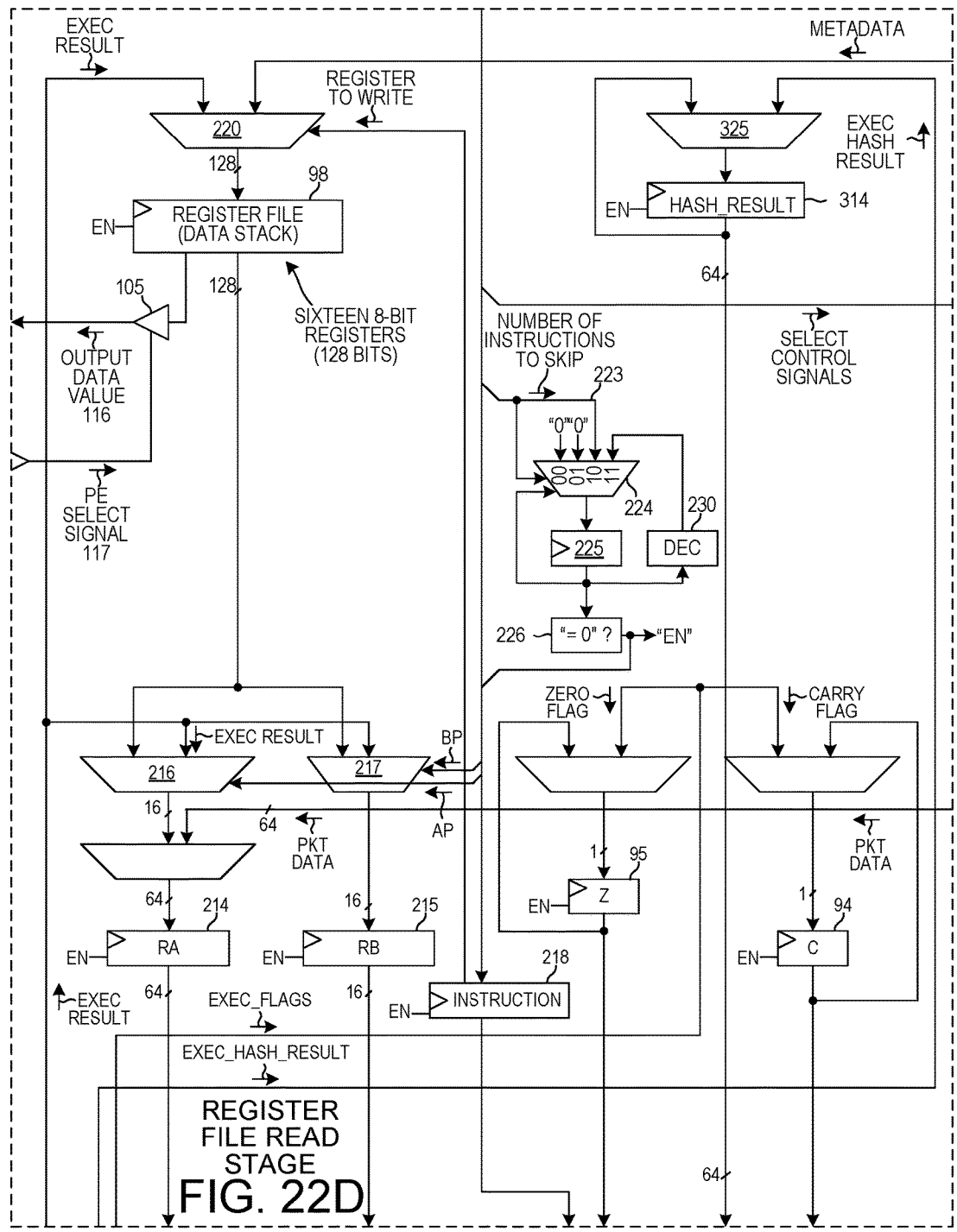
FIG. 22D is a part of the larger diagram of FIG. 22.
Figure 22E:
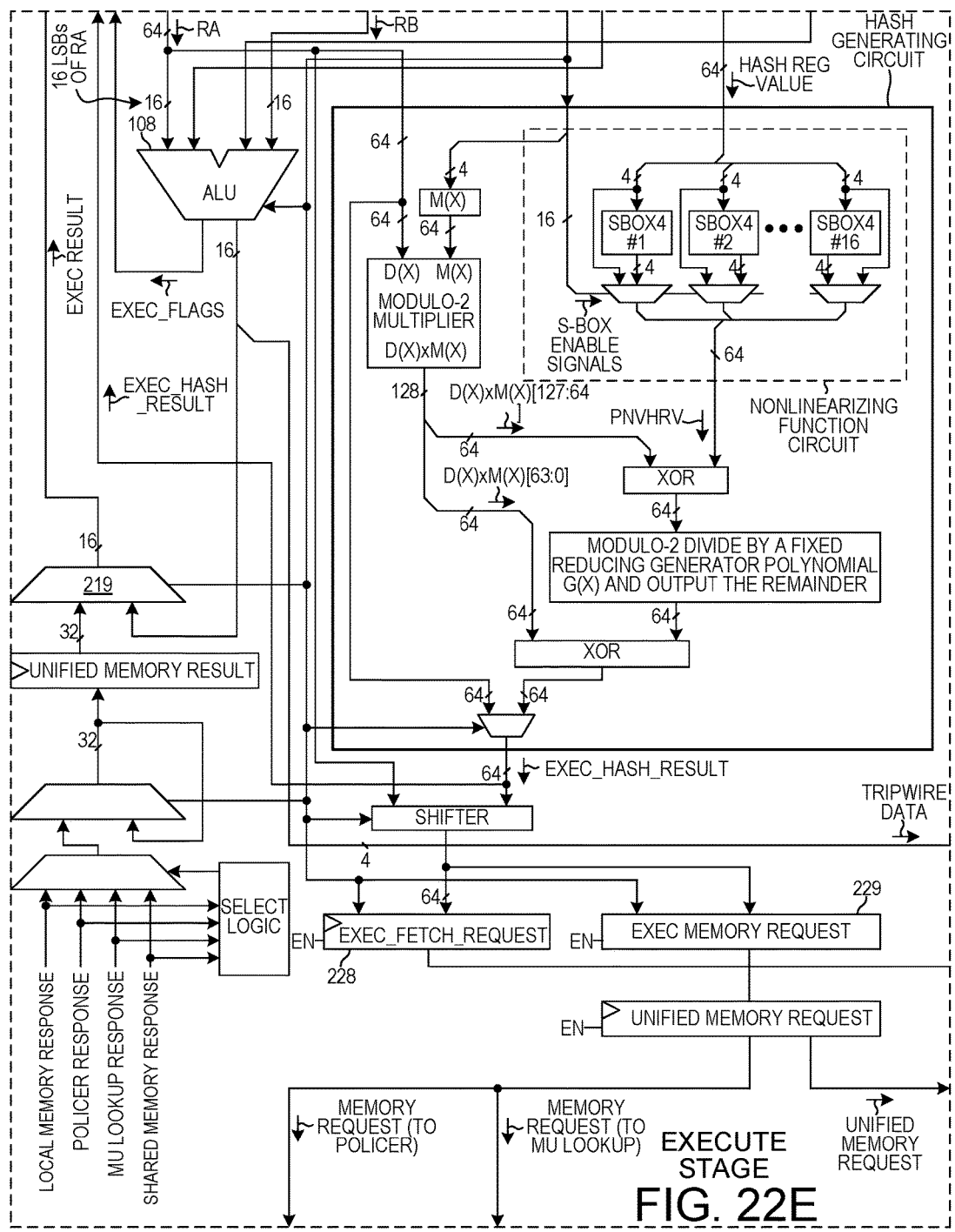
FIG. 22E is a part of the larger diagram of FIG. 22.
Figure 22F:
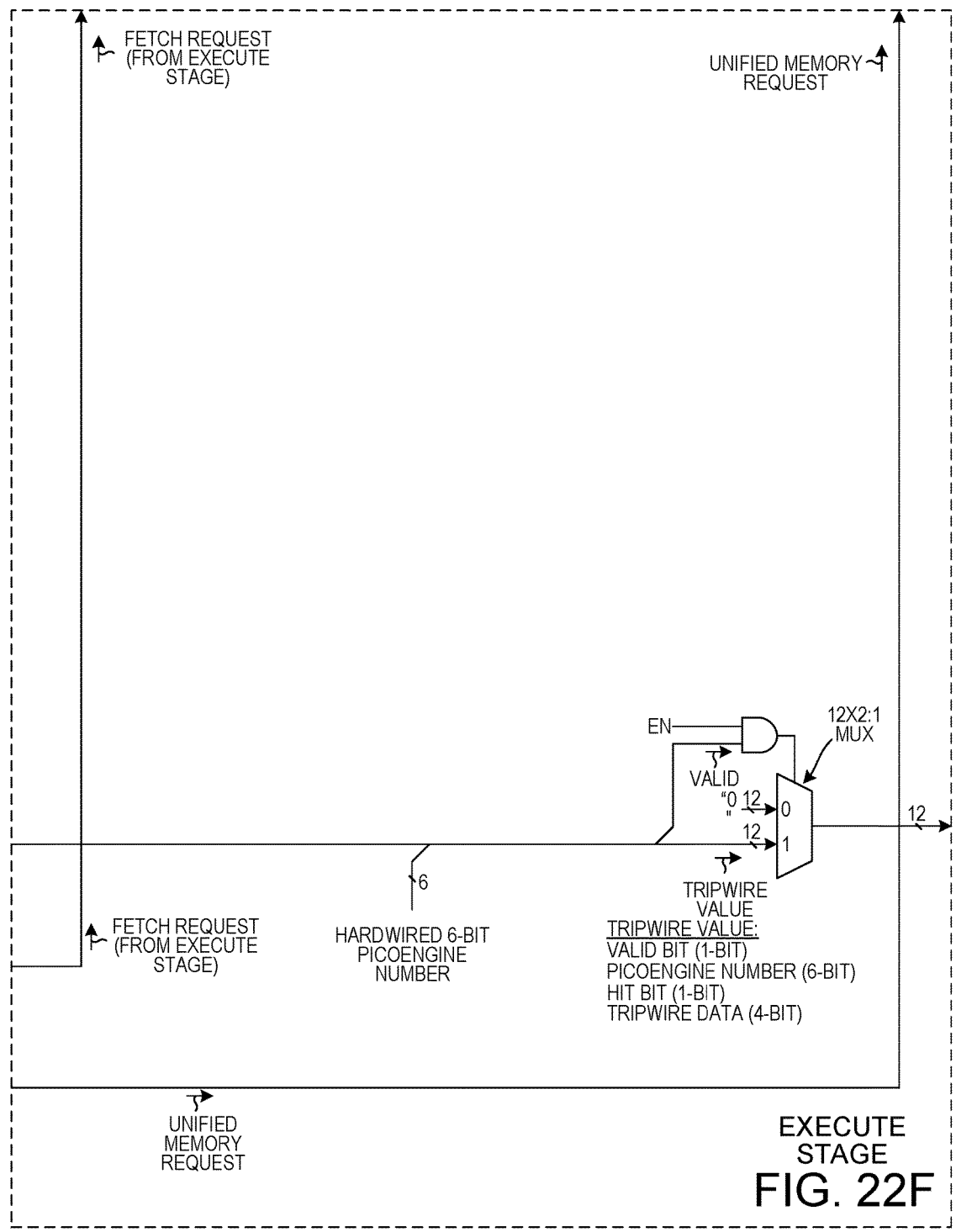
FIG. 22F is a part of the larger diagram of FIG. 22.

FIG. 21 is a simplified diagram of the lookup table circuit 87 in the fetch request stage 66 of FIG. 4. The data contents of the memory portion 174 can be written via a control bus CB 175. An address 176 of a memory location in the memory portion 174 is supplied via lines 177, and the read/write signal 178 is set to indicate a write operation, and the data 179 to be written is supplied via the control bus 175 to the memory portion 174. In this way, the contents of the addressed memory location of the memory portion 174 are pre-loaded and setup before processor 62 operation, or during downtimes during which the processor 62 is not being used. To perform a table number value to base address value lookup, the table number 182 is supplied to the lookup table circuit 87 via input conductors 183 when the read/write control signal 178 is set to indicate a read operation. The read/write signal controls the address multiplexer 180. The multi-bit content of the memory location addressed by the table number value is then output from the lookup table circuit 174 onto output conductors 181 as the base address value.

In one example, to realize an integrated circuit embodiment of the pipelined run-to-completion processor 4 of FIG. 1, the function of the each circuit block of the processor 4 is described in a hardware description language (for example, CDL or Verilog or VHDL). A commercially available hardware synthesis program (for example, Synopsis Design Compiler) is then employed to generate digital logic circuitry from the hardware description language description, where the synthesized digital logic circuitry performs the function described by the hardware description language. The processor 4 is realized in this way to be a small circuit of about ten thousand equivalent gates. An embodiment of processor 4 may be made available by one company as a predesigned block of circuitry that is then incorporated into another company's integrated circuit design as a general purpose block. Such a predesigned block of IP is sometimes referred to in the art as a block of "IP". A hardware designer who incorporates the predesigned block of IP into a larger integrated circuit design need not understand or be aware of the internal structure and operation of the pre-designed block, but rather interfaces to the pre-designed block in accordance with an interface description supplied by the original designer of the predesigned block. Rather than being supplied as a block of IP to be incorporated into another integrated circuit, the novel processor 4 can be supplied to end customers as a separate discrete integrated circuit of general utility in data processing applications.

FIGS. 22A through 22J together form a larger diagram of FIG. 22. FIG. 22 is a detailed diagram of one specific implementation of the pipeline 65 of the run-to-completion processor 62 of FIG. 4. One 128-bit block of octets is received onto the processor from the memory 63 via memory interface port 74. The 128 bits pass through multiplexer 200 and are latched into pre-fetch data register 201. The 128 bits pass through multiplexer 202 and are clocked into fetch data register 203. The least significant (leftmost) twenty-four of the bits pass from the fetch data register 203 down to a "delineate instruction" block 204 in the decode stage 9. The 128 bits also pass to the left to a shifter 205. The shifter shifts the 128-bit value on its input to the right, either by 0 bits, 8 bits, 16 bits, or 24 bits. The number of bits shifted is determined by the 2-bit value on input leads 206. When performing a shift, the leftmost bits of the resulting shifted value are replaced with one, two, or three NOP instruction opcodes. The resulting shifted 12-bit value is supplied from the shifter 205 to input 207 of multiplexer 202. In the decode stage, the "delineate instruction" block 204 examines the least significant twenty-four bits of the incoming 128-bit block, and looks at the leading bits of the octets. From these leading bits, the "delineate instruction" block determines whether the octet in the least significant bit position is the first octet of a single-octet instruction, or is the first octet of a two-octet instruction, or is the first octet of a three-octet instruction. The number of octets of this first instruction is output as the "number of octets consumed" signal 100. This "number of octets consumed" signal 100 is the control signal supplied to shifter 205. Accordingly, after the first leftmost instruction has been decoded, the 128-bit incoming value to the shifter is shifted to the right by a number of octets such that the leftmost octet of the least significant 24-bits supplied to the "delineate instruction" block 204 is the leftmost octet of the next instruction. In this way, as instructions are decoded, the shifter 205 shifts the 128-bit value to the right a number of octets so that the "delineate instruction" block receives the next instruction to be deciphered.

In addition to determining the number of octets in the instruction, the delineate instruction block 204 also examines the instruction and determines the instruction type, as indicated by the opcode of the instruction. The instruction can be a local operation, a decode packet operation, a decode memory operation, a decode hash operation, a decode fetch operation, or a decode miscellaneous operation. Each of the decode blocks 208-213 examines and decodes the twenty-four bits output by the "delineate instruction" block 204 and outputs a set of fifty-two "individual decoded instruction" bits. For example, three bits of the "individual decoded instruction" bits are denoted "RFA_SRC" and this value is used to generate the pointer AP that is then stored in AP register 90. The pointer AP is used to select a part of the register file 98 that is then clocked into the A register 214. For example, three bits of the "individual decoded instruction" bits are denoted "RFB_SRC" and this value is used to generate the pointer BP that is then stored in register 91. The pointer BP is used to select a part of register file 98 that is then clocked into the B register 215.

Multiplexer 216 receives all the bit values stored in the register file 98, and selects one sixteen-bit portion based on the pointer AP (as supplied onto the select input of the multiplexer 216). Similarly, multiplexer 217 receives all the bit values stored in the register file 98, and selects one sixteen-bit portion based on the pointer BP (as supplied onto the select input of the multiplexer 217). The register file read stage supplies values, such as the contents of the A register 214 and the B register 215, to inputs of the ALU 108. The contents of the instruction register 218 determines the operation performed by the ALU 108. The sixteen-bit output value of the ALU 108 passes through multiplexer 219 and multiplexer 220 and is clocked back into the register file 98. Some of the bits of the register file 98 are the output data value 116. If the output data value 116 is to be read by an external circuit, then the external circuit asserts the PE select signal 117 so that the output buffers 105 are enabled. The output buffers 105 drive the output data value 116 to the external circuit. Depending on the instruction to be executed, the register A 214 can be loaded with a 16-bit part of the contents of the input data register 99. Which 16-bit part is determined by the instruction decode. The selected part is supplied by multiplexer 221 and multiplexer 222 to register A 214.

If the instruction being decoded is a skip instruction, then the skip count is supplied via conductors 223 to multiplexer 224. If the number of instructions to be skipped is zero, then either the "00" multiplexer input or the "01" multiplexer input is selected. In either case, a value of zero passes through multiplexer 224 and is latched into register 225. If the value as output by register 225 is zero, then the EN signal output of comparator 226 is asserted. All the registers 98, 218, 314, 215, 94, 95, 228 and 229 have synchronous enable signal inputs, and these inputs are coupled to receive the enable signal EN. Consequently, if the number of instructions to skip is zero, then these registers are enabled, and the execution of no instruction is skipped. If, however, the number of instructions to skip as supplied to multiplexer 224 is not zero, then muiltiplexer 224 initially couples the value on its "10" input to its output. The number of instructions to skip is therefore clocked into register 225. Because the value supplied to comparator 226 is non-zero, the enable signal EN is not asserted and the registers listed above are disabled (not enabled). This disabling prevents execution of an instruction. On the next clocking of the pipeline, the decremented number of instructions to skip (as output by decrementer 230) is passed back through multiplexer 224 and is latched into register 225. This process of decrementing the number of instructions to be skipped, clock cycle by clock cycle, is continued until the decremented number equals zero. When the decremented number equals zero, then the comparator 226 causes the enable signal EN to be asserted, which in turn stops the skipping of execution of instructions. Due to the enable signal EN having been deasssserted for a number of clock cycles, execution of the appropriate number of instructions is prevented.

FIG. 23 is a more detailed diagram of shifter 205.

The intelligent packet data register file 107 is illustrated in FIG. 22G. The execution of certain instructions require some of the input packet data to be supplied to the execute stage so that the execute stage can carry out an operation using that packet data. The initial fetch information that prompts the first fetch by the processor 62 is received into the fetch request stage 66 of the processor, but the incoming input data value 79 is received via conductors 20 into the intelligent packet data register file 107. This includes an initial 16 bytes of metadata (for example, flags that indicate different characteristics of the packet) followed by 48 bytes of the beginning portion of the packet. As indicated on FIG. 22H, the sixteen bytes of metadata is loaded into the input data register 99, whereas the forty-eight bytes of the beginning part of the packet passes down and is loaded into the intelligent packet data register file 107 shown in FIG. 22G. The first sixteen bytes of the packet data are loaded into a first slice portion SLICE0, the second sixteen bytes are loaded into a second slice portion SLICE1, and the third sixteen bytes are loaded into a third slice portion SLICE2. Each slice portion maintains a 4-bit value that indicates the number of the 16-byte section of packet data that the slice stores, so in this case the 4-bit value (see "16B NUMBER" 261 of FIG. 24) maintained by slice portion SLICE0 is "0000", the 4-bit value maintained by slice portion SLICE1 is "0001", and the 4-bit value maintained by slice portion SLICE2 is "0010". The only legal values for SLICE0 to hold are "0000", "0011", "0110" and so forth, whereas the legal values for SLICE1 to hold are "0001", "0100", "0111" and so forth, whereas the legal values for SLICE2 to hold are "0010", 0101", "1000" and so forth. If execution of an instruction requires an amount of the packet data, then the appropriate packet data is supplied by the intelligent packet data register file 107 through OR gates 231 and multiplexer 222 to the execute stage. For such an instruction, the packet pointer PP 93 (see FIG. 22C) holds a packet pointer value that identifies the beginning byte of the portion of the packet data that is to be supplied to the execute stage. The packet pointer value is a byte number. Each of the bytes of the packet portion that is stored in the intelligent packet data register file 107 has a byte number, where the byte number is the byte number of the byte in the overall amount of packet data. As described above, the overall amount of packet data (240 bytes) is stored in the packet buffer memory 13 (see FIG. 2), whereas only a forty-eight byte portion of that is stored in the intelligent packet data register file 107. If the portion of the packet data required for execution of the instruction is present in intelligent packet data register file 107, then this packet portion is supplied to the execute stage via OR gates 231 and multiplexer 222 as set forth above. But if the portion of the packet data required for execution of the instruction is not present in the intelligent packet data register file 107, then the intelligent packet data register file 107: 1) outputs a stall signal 232 via conductor 233 to the state machine 64 (see FIG. 4), and outputs a packet portion request 56 that is communicated to the packet buffer memory 13. The packet portion request 56 passes through a first level arbiter 234 and out of the processor. Packet portion requests for all the processors of the pool 9 are communicated via separate conductors to the second level arbiter 58 (see FIG. 3). The conductor 57 extending from the processor PE1 is labeled in the diagram of FIG. 3. The packet portion request then passes from the second level arbiter 58 and across conductors 59 to the packet buffer memory 13. Meanwhile, the stall signal 232 has caused the state machine 64 to stop the clock signal supplied to the processor. The processor therefore stops clocking, and is said to be "stalled". The packet portion request includes: 1) the 8-bit starting byte number of the first byte of packet data requested, 2) a 4-bit value that indicates the number bytes of the packet portion requested, 3) a 5-bit identifier that identifies the particular processor from which the request originated, and 4) a 2-bit identifier that identifies the slice portion that initiated the request. The packet buffer memory stores the packet data in a byte-ordered fashion, so the packet memory can read the requested bytes out of its memory, and sends the requested packet portion back to the processor via conductors 61 (see FIG. 3). In this simplified example, the conductors 61 extend in parallel to all slices of all processors. Along with the 16-bytes of packet data is a one-bit valid flag, the 5-bit identifier that identifies the particular processor from which the request originated, and the 2-bit identifier that identifies the slice portion that initiated the request. As mentioned above, this data is supplied by conductors 61 to all the processors of the pool 9 in parallel at the same time, but only the one processor (indicated by the identifier that accompanies the data) clocks the data into its intelligent packet data register file. Once the requested data is present in the intelligent packet data register file, it is supplied via OR gates 231 and multiplexer 222 and the A register 214 to the execute stage. If a particular slice portion is not supplying a data bit value onto one of its output conductors, then the slice portion supplies a digital zero value onto that output conductor. As a result, the 64×3:1 OR gates 231 perform a wire-OR multiplexing function and communicate packet portions from the slice portions through the same conductors to the multiplexer 222, and on to the execute stage. Once the data necessary for execution of the next instruction is being supplied to the execute stage, the intelligent packet data register file 107 de-asserts the stall signal 232. The state machine 64 responds by starting the clocking of the processor again, thereby restarting ("unstalling") the processor. In the next clock cycle, the execute stage then uses the packet data in the way specified by the instruction being executed.

In the present example, the intelligent packet data register file 107 actually comprises three slice portions SLICE0, SLICE1 and SLICE2. Each one has a four-bit register that stores a value indicating the number of which particular 16-byte portion of the packet data it is that the slice portion is storing. Each slice portion is to store only certain of the 16-byte portions of the overall packet data. For example, the slice portion SLICE0 is to store 16-byte portion number 0 or 3 or 6 or 9 or 12 and so forth. Slice portion SLICE1 is to store 16-byte portion number 1 or 4 or 7 or 10 or 13 and so forth. Slice portion SLICE2 is to store 16-byte portion number 2 or 5 or 8 or 11 or 14 and so forth. The number of such a 16-byte slice is maintained as a 4-bit value (see "16B NUMBER" 261 of FIG. 24). Based on the portion of the packet data needed for execution of the instruction, and based on the value of the 4-bit value that indicates which 16-byte portion the slice portion is storing, each slice portion independently determines whether it should be supplying data to the execute stage, and if so whether it currently stores the data or whether it should stall the processor and issue a packet portion request to get the data. Each slice portion issues packet portion requests to the first level arbiter 234 via a dedicated set of conductors, and receives back a grant signal from the first level arbiter 234 via another dedicated set of conductors. Likewise, the first level arbiter 234 outputs a packet portion request (for example, request 56) to the second level arbiter 58 by a dedicated set of conductors (in the case of PE#1 this set of conductors is the set 57), and receives back a grant signal 236 via another dedicated set of conductors. In this way, the first level arbiter outputs packet portion requests one at a time, and the second level arbiter outputs packet portion requests one at a time. To support data to the execute stage for an instruction, one or more of the slice portions may issue packet portion requests.

In one novel aspect, it is recognized that in general the processing of the packet data occurs sequentially by byte number. It is somewhat unusual to process a later byte of packet information, and then to return to processing earlier bytes of the packet data. Moreover, all the beginning bytes of the packet data are generally processed in some way. Due to these characteristics of the packet data and the usual processing of the packet data, the intelligent packet data register file 107 under some conditions performs what is called "packet portion prefetching". The intelligent packet data register file 107 seeks to keep the sixteen bytes of packet data that immediately follows the last byte of packet data that was processed. If packet data is to be processed, then the packet pointer PP 93 will typically store the byte number of the first byte of the packet data to be supplied to the execute stage, so the packet pointer can be used to determine what the next sixteen bytes of packet data are. In one example, packet portion prefetching is enabled, and instructions are used to process packet data that (after the packet data has been processed) cause the packet pointer to be changed so that it points to the next byte immediately following the last packet data byte processed by the instruction. The intelligent packet data register file 107 responds to such changes in the packet pointer value. If the packet pointer value changes in this way at the conclusion of execution of an instruction that has just used the prior amount of packet data, and if packet portion prefetching is enabled, and if a slice portion determines that it is a slice portion that should store one or more of the bytes of the prefetch window but it does not presently store these bytes, then that slice portion will issue a packet portion request to request the missing bytes from the packet buffer memory. Each slice portion makes this determination independently. The processor is not stalled, but rather the retrieval of the packet portion from the packet buffer memory occurs at the same time that the processor is executing other instructions. Hopefully, when and if a subsequent instruction requires bytes of packet data in the window, then the slices of the intelligent packet data register file will have already received those bytes and will be storing those bytes so that the processor does not have to be stalled. It is possible that packet data is prefetched from the packet buffer memory, but then there is no subsequent instruction whose execution requires the prefetched bytes, so the prefetch retrieval from the packet buffer memory was unnecessary. On average, over time, the benefit of not stalling the processor is seen to outweigh the cost of unnecessary retrievals of packet portions from the packet buffer memory. It is also possible that even though packet portion prefetching is enabled, and even though execution of a prior instruction caused the packet pointer to be changed, that none of the slice portions determines that packet portion prefetching is required at that time. As described above, instructions are provided in the picoengine instruction set to enable conditional prefetching, and disabling of prefetching under certain circumstances.

Figure 24:
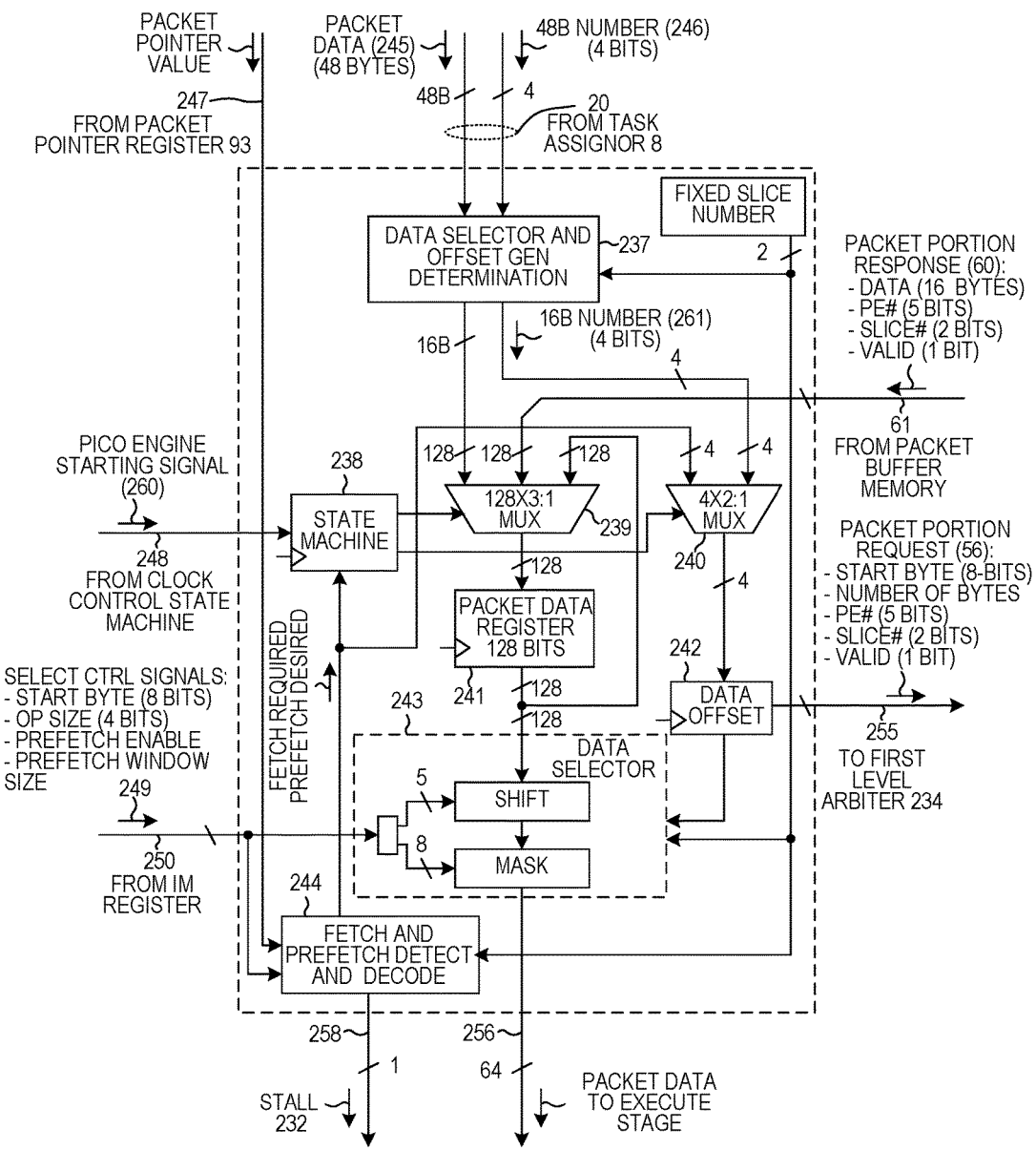
FIG. 24 is a block diagram of one slice portion of the intelligent packet data register file in the register file read stage of the picoengine processor of FIG. 3.

FIG. 24 is a block diagram of slice portion SLICE0 of FIG. 19G.

Figure 25:
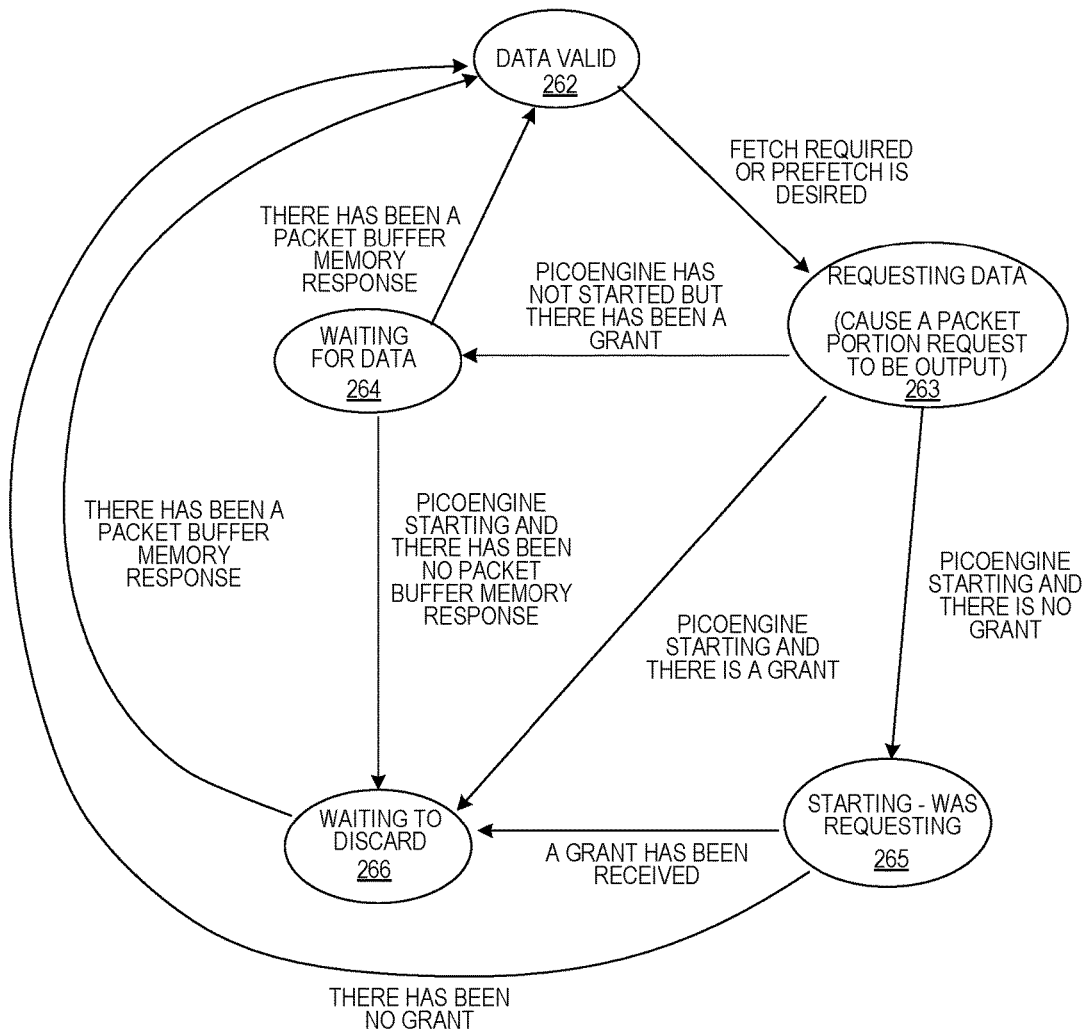
FIG. 25 is a state diagram for the state machine in the slice portion of FIG. 24.

FIG. 25 is a state diagram for the state machine 238 of SLICE0 of FIG. 24. The state machine 238 has a "data valid" state 262, a "requesting data" state 263, a "waiting for data" state 264, a "starting—was requesting" state 265, and a "waiting to discard" state 266.

All of the three slice portions SLICE0, SLICE1 and SLICE2 of the intelligent packet data register file 107 are of identical construction, but for their different fixed 2-bit slice numbers. Slice portion SLICE0 includes a data selector and offset generator 237, a state machine 238, a 128-bit wide 3-to-1 multiplexer 239, a 4-bit wide 2-to-1 multiplexer 240, a 128-bit packet data register 241, a data offset generator 242, a data selector 243, a fetch and prefetch detect and decoder 244, and hardwired fixed slice number signal output circuit. Initially upon picoengine startup, SLICE0 receives forty-eight bytes of packet data 245, but in addition to this the SLICE0 also receives a 4-bit number 246 that indicates which 48-byte portion of the overall larger amount of packet data that 48-byte portion is. In the case of picoengine startup, this 4-bit value is "0000", because the 48-byte portion is the very first 48-byte portion of the overall 240 bytes of packet data in the packet buffer memory. Both the 48-byte portion of packet data and the 4-bit number are received onto the SLICE0 via conductors 20.

SLICE0 also receives the packet pointer value from the packet pointer register PP 93 via conductors 247. SLICE0 also receives a "picoengine starting" signal 260 from the clock control state machine 64 via conductor 248. SLICE0 also receives select control signals 249 from the immediate data register IM 97 via conductors 250 (see FIGS. 22C, 22D, 22G). These select control signals are decodes of the instruction and are the values of different bits of the immediate data register IM 97 of FIG. 22C. These select control signals 249 include: 1) an 8-bit "start byte value" 251, 2) a 3-bit "operation size value" 252, 3) the "prefetch enable" bit value 253, and 4) the "prefetch window size" bit value 254. SLICE0 also receives packet portion response information 60 back from the packet buffer memory, and this packet portion response information 60 is received via conductors 61. As mentioned above, this packet portion response information 60 includes: 1) sixteen bytes of packet data, 2) a valid bit, 3) the 5-bit identifier (PE#) that identifies the particular picoengine, and 4) the 2-bit identifier (RF SLICE#) that identifies the slice portion that initiated the request. SLICE0 also outputs packet portion requests. In the case of SLICE0 being in the first picoengine PE1, this packet portion request 56 is output on the set of conductors 255, and passes to the first level arbiter 234 of the picoengine, the from the first level arbiter and out of the picoengine, then across conductors 57 to the second level arbiter 58 of the pool, and then across conductors 59 to the packet buffer memory 13. SLICE0 outputs its packet data onto conductors 256 so that the packet data passes through OR gates 231, across conductors 257, through multiplexer 222, and through the RA register 214, and to the execute stage. SLICE0 outputs a stall signal (for example, stall signal 232) onto conductor 258. This stall signal 232 passes through OR gate 259 and via conductor 233 to the clock control state machine 64 of the picoengine.

In the simplest case, the input data value (packet data) is received, but the instruction executed only uses the 48 bytes initially supplied into the picoengine. Accordingly, the intelligent packet data register file 107 does not need to issue any packet portion request to the packet buffer memory to retrieve packet data needed for execution of the instruction. The slice in this case receives an asserted "picoengine started" signal indicating that the picoengine is to be starting the execution of code for a new amount of packet data and that the data input value (packet data) is valid. The "16B NUMBER" 261 as determined by the data selector and offset generator 237 of the slice is "0000", and this value is clocked into the data offset register 242. This slice portion also selects the appropriate sixteen byte section of the incoming forty-eight bytes of packet data to supply on to the multiplexers 239, and these sixteen bytes of packet data are loaded into the packet data register 241. This slice portion is SLICE0, so the output of the fixed slice number block is "00". The fetch and prefetch detect and decode 244 and the data selector 243 use the incoming start byte number (the number of the first byte of the block required for execution of the instruction), the operation size (the size of the block of bytes required for execution of the instruction), and the "16B NUMBER" 261, to: 1) determine if this slice has any of the bytes of packet data needed for execution of the instruction, 2) determine how much to shift its sixteen bytes left by, and, 3) determine what output bytes to mask to be zeros (because all output conductors that are not carrying valid byte data should be zeroed out). The valid bytes being supplied by the intelligent packet data register file 107 to the execute stage should be left-aligned, and the number of bytes being supplied varies from instruction to instruction. The left shift function of the data selector is required in order to properly align any valid bytes being supplied by this slice so that those bytes, when merged with any other valid bytes being supplied and aligned by the other slices, together form the proper amount of left-aligned valid data. The values supplied onto conductors 256 by this slice SLICE0 are ORed by OR gates 231 (see FIG. 22G) with the values supplied by the other two slices so that all requested bytes from all three slices are present on the set of sixty-four conductors 257. The logic value on any of these sixty-four conductors 257 that does not carry a valid byte (as required for execution of the instruction as determined by the instruction decode) is masked off to be zero. The number of valid bytes so supplied in left-aligned fashion onto the sixty-four conductors 257 is determined by the operation size value.

The state machine 238 starts off in this simplest case in the "data valid" state. This means that the packet data register 241 contains the data needed from this slice portion. Because the packet data register 241 always had the data needed, in this simplest case, the state machine did not transition from the data valid state to any other state. In this way, the slice does not cause a fetch of any bytes from the packet data memory if the slice determines, based on the start byte value, the operation size, and the "16B NUMBER", that the slice has all the bytes indicated as being required for execution of the instruction.

In a more complex situation, picoengine execution indicates that one or more bytes that the slice that should contain is not stored in the slice. This determination is made by the fetch and prefetch detect and decode block 244 based on the start byte value, the operation size, and the "16B NUMBER". The block 244 indicates that a fetch is required by asserting the "fetch required" signal. Block 244 also indicates what bytes should be fetched by this slice. The state machine 238, in response, transitions to the "requesting data" state, which prompts the output of a packet portion request. Because a packet portion request is now pending for data, and the slice is supposed to be storing this data, but the block 244 has determined that the slice does not presently store the requested data, the stall signal is asserted in order to stall the picoengine pipeline so that the needed packet data can be obtained back from the packet buffer memory. At some point a grant is received back from the first level arbiter, and this causes the state machine to transition from the "requesting data" state to the "waiting for data" state. Eventually a packet portion response will be received that is destined for this slice, but in the meantime the state machine remains in the "waiting for data" state. When the packet portion response from the packet buffer memory is received, the data is loaded into the packet data register 241 and the state machine 238 detects that the packet portion response has been received. Because the packet data register 241 is determined to now contain the packet data that this slice is to supply to the pipeline, the state machine 238 transitions to the "data valid" state. As explained above in connection with the simplest case, the data selector 243 shifts the data as output by the packet data register 241 by the appropriate amount, and masks all bytes that are not bytes to be supplied by this slice, so that the bytes that this slice is to supply are output onto conductors 256 in the correct byte positions. Returning to the "valid data" state causes the fetch and prefetch detect and decode block 244 to de-assert the stall signal. In this case, the packet portion request had to be output, and the pipeline had to be stalled in order to obtain the needed bytes of packet data back from the packet buffer memory. The reading of this packet data is therefore referred to as a "fetch" as opposed to an optional "prefetch".

If prefetching is enabled, and if the packet pointer is changed, then the fetch and prefetch detect and decode 244 examines the packet pointer, the prefetch window size, and the "16B NUMBER", and determines from these values a prefetch window of bytes. The slice also determines whether one or more of the bytes are bytes that this slice is responsible for handling. If there is one or more such bytes, and if the slice is not currently storing that byte or bytes, then the fetch and prefetch detect and decode block 244 outputs a "prefetch desired" signal to the state machine 238 along with an indication of which bytes are to be prefetched. The asserting of the "prefetch desired" signal causes the state machine 238 to transition to the "requesting data" state. A packet portion request is output from the slice. When a grant is received back from the first level arbiter, the state machine 238 waits in the "waiting for data" state. When the packet portion is received from the packet buffer memory, the data is loaded into the packet data register and the state machine transitions to the "data valid" state. Hopefully all of this is performed before the pipeline actually executes an instruction that requires the now-buffered packet data in the packet data register 241 of the slice.

There is another condition, however, in which a prefetch operation has been initiated and the slice is waiting either for a grant or for the packet data to be returned by the packet buffer memory, but then it is determined that the pipeline will never need the data (the data being prefetched) and the pipeline terminates execution of its instructions for that prior amount of packet data in the packet buffer memory, and an indication is received that the picoengine will receive another new input data value and associated new task assignment. If the state machine is in the "requesting data" state, and the "picoengine starting" signal is received, then the state machine transitions either to the "starting—was requesting" state or to the "waiting to discard" state. If the packet portion request had already been output by the slice, but no grant of that request had yet been received back, then the slice may be able to effectively cancel the request before the request is actually submitted to the packet buffer memory. In the "starting—was requesting" state and request is removed, and if no grant has still be received back by the time of the next clock, then the request has effectively been canceled and the state machine returns to the data value state. If, however, in the "starting—was requesting" state, despite the fact that the request has been removed, the arbiter returns a grant at the next clock, then the arbiter has accepted the request and the cancelling of the request was unsuccessful. In such a case the state machine has to transition to the "waiting to discard" state because packet data will eventually be returned by the packet buffer memory. Accordingly, the slice waits for the data to be returned (even though the prefetch was not required and the data turns out not to have been needed). When the packet portion response is received by the slice, the packet data is discarded or ignored, and the state machine transitions from the "waiting to discard" state to the "data valid" state. Similarly, if the state machine is in the "requesting data state" (a packet portion request has been output from the slice) and a grant is received, then even though the picoengine will be starting on a new amount of packet data, the slice must first wait for the unwanted data to be returned from the packet buffer memory. The state machine therefore in this case transitions from the "requesting data" state to the "waiting to discard" state. In the "waiting to discard" state, if the packet portion response is received, then the packet portion can be discarded and the state machine can transition to the "data valid" state. Once in the "data valid" state, the slice and picoengine are freed up to begin working on the new packet data for a new task assignment.

FIGS. 26A-26E together form a larger diagram of FIG. 26 as set forth in the key of FIG. 26 on the lower right of FIG. 26E. FIG. 26 sets forth a hardware description (in the CDL hardware description language) of a particular embodiment of a slice portion of the intelligent packet data register file. In order to realize this embodiment, a commercially available hardware synthesis program (for example, Synopsis Design Compiler) is employed to generate digital logic circuitry from the CDL hardware description language description. Although a particular embodiment is illustrated and described above for illustrative and instruction purposes, it is to be understood that there are many different ways to implement the slice portion. The present disclosure encompasses all such embodiments, including all such embodiments that would be generated by standard commercially available hardware synthesis tools once a functional description of the novel intelligent packet data register file has been properly supplied to the tool.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An integrated circuit comprising:
   a packet buffer memory that stores an amount of packet data, wherein the packet data stored in the packet buffer memory comprises a plurality of bytes of packet data;
   a packet portion request bus;
   a packet portion data bus; and
   a plurality of processors, wherein each processor comprises a clock control state machine, a stall conductor, a decode stage, an execute stage, and a register file read stage, wherein the register file read stage comprises an intelligent packet data register file, wherein the intelligent packet data register file is adapted to send a packet portion request via the packet portion request bus to the packet buffer memory, wherein the intelligent packet data register file is adapted to receive in response a packet portion from the packet buffer memory via the packet portion data bus, wherein the intelligent packet data register file is adapted to assert and de-assert a stall signal, wherein the stall signal is communicated via the stall signal conductor to the clock control state machine, wherein the de-asserting of the stall signal causes the processor to resume clocking, wherein the intelligent packet data register file cannot store all of the amount of packet data that is stored in the packet buffer memory, and wherein there is only one packet buffer memory that is shared by the plurality of processors.

2. The integrated circuit of claim 1, wherein the packet portion is a set of one or more of the bytes of packet data.

3. The integrated circuit of claim 1, wherein the packet portion request includes a processor identifier, wherein the processor identifier identifies one of the plurality of processors, and wherein said one processor is the processor that sent the packet portion request to the packet buffer memory.

4. The integrated circuit of claim 1, wherein the packet portion is received by the intelligent packet data register file along with a processor identifier, wherein the processor identifier identifies one of the plurality of processors, and wherein said one processor is the processor that sent the packet portion request to the packet buffer memory.

5. The integrated circuit of claim 1, wherein the decode stage is adapted to decode an instruction, wherein a processing of the instruction by the processor causes a set of bytes of packet data to be supplied to the execute stage, and wherein the intelligent packet data register file during the processing of the instruction asserts the stall signal if the intelligent packet data register file is not storing all the bytes of the set at a particular time whereas if the intelligent packet data register file is storing all the bytes of the set at the particular time then the intelligent packet data register file does not assert the stall signal.

6. The integrated circuit of claim 5, wherein the particular time is a time after a decoding of the instruction by the decode stage but before set of bytes is supplied to the execute stage.

7. The integrated circuit of claim 1, wherein the packet portion request includes a packet portion identifier, wherein the packet portion identifier comprises: 1) a start byte number, and 2) a number of bytes of the packet data.

8. The integrated circuit of claim 1, wherein the intelligent packet data register file comprises means for: 1) storing a plurality of bytes of packet data, 2) determining whether all bytes of packet data required for execution of a packet data instruction are stored in the intelligent packet data register file, 3) asserting and de-asserting the stall signal, 4) generating and outputting packet portion requests, 5) receiving packet portions from the packet buffer memory in response to packet portion requests.

9. The integrated circuit of claim 1, wherein the intelligent packet data register file comprises a plurality of slice portions, and wherein each slice portion comprises a register and a state machine.

10. The integrated circuit of claim 1, wherein the packet portion is received by the intelligent packet data register file along with a slice portion identifier, wherein the intelligent packet data register includes a plurality of slice portions, and wherein the slice portion identifier identifies one of the slice portions.

11. The integrated circuit of claim 1, wherein the packet buffer memory stores no instruction executable by any one of the plurality of processors, and wherein the processor cannot write any data into the packet buffer memory.

12. The integrated circuit of claim 1, wherein the packet portion request bus includes multiple sets of bus conductors and an arbiter circuit, wherein the arbiter circuit receives packet portion requests from the processors and sends packet portion requests to the packet buffer memory.

13. The integrated circuit of claim 1, wherein a packet portion received from the packet buffer memory via the packet portion data bus is supplied in parallel via the packet portion data bus to all of the processors of the plurality of processors, and wherein the intelligent packet data register file of only one of the processors loads the packet portion.

14. An integrated circuit comprising:
   a packet buffer memory that stores an amount of packet data, wherein the packet data stored in the packet buffer memory is a plurality of bytes of packet data;
   a first processor, wherein the first processor comprises a clock control state machine, an intelligent packet data register file, and a stall signal conductor that extends from the intelligent packet data register file to the clock control state machine, wherein the intelligent packet data register file asserts and de-asserts a stall signal on the stall signal conductor and issues packet portion requests, wherein the de-asserting of the stall signal causes the first processor to resume clocking, and wherein the intelligent packet data register file of the first processor cannot store all of the amount of packet data that is stored in the packet buffer memory;
   a second processor, wherein the second processor comprises a clock control state machine, an intelligent packet data register file, and a stall signal conductor that extends from the intelligent packet data register file to the clock control state machine, wherein the intelligent packet data register file asserts and de-asserts a stall signal on the stall signal conductor and issues packet portion requests, wherein the de-asserting of the stall signal causes the second processor to resume clocking, and wherein the intelligent packet data register file of the second processor cannot store all of the amount of packet data that is stored in the packet buffer memory;
   first means for communicating packet portion requests from the first and second processors to the packet buffer memory, wherein a packet portion request comprises:

an identifier that identifies a packet portion, and an identifier that identifies one of the processors; and second means for communicating packet portions from the packet buffer memory and to the intelligent packet data register file of the first processor and to the intelligent packet data register file of the second processor, wherein each packet portion is communicated by the second means along with an identifier that identifies one of the processors.

15. The integrated circuit of claim 14, wherein the identifier of the packet portion request includes: 1) a start byte number, and 2) a number of bytes.

16. The integrated circuit of claim 15, wherein the first processor is clocked by a first clock signal, wherein asserting the stall signal of the first processor causes the clock control state machine of the first processor to stop the first clock signal so that the first processor stalls, wherein the second processor is clocked by a second clock signal, wherein asserting the stall signal of the second processor causes the clock control state machine of the second processor to stop the second clock signal so that the second processor stalls.

17. The integrated circuit of claim 16, wherein the intelligent packet data register file of the first processor comprises:

a register; and means for: 1) asserting the stall signal and outputting a packet portion request if all bytes of packet data required for execution of a packet data instruction are not stored in the intelligent packet data register file of the first processor; and 2) receiving a packet portion and in response de-asserting the stall signal.

18. A method comprising:

(a) storing an amount of packet data in a packet buffer memory, wherein the packet data is a plurality of bytes of a packet, wherein the bytes have an order in the packet, and wherein the bytes are stored in the packet buffer memory in the same order that the bytes have in the packet;

(b) decoding an instruction in a decode stage of a pipelined processor, wherein the pipelined processor is one of a plurality of substantially identical processors that are operatively coupled to the packet buffer memory, wherein the packet buffer memory stores no instruction that is executable by any of the plurality of substantially identical processors;

(c) determining that an intelligent packet data register file of the pipelined processor does not store one or more bytes of packet data required for execution of the instruction, wherein the determining of (c) is performed by the intelligent packet data register file, wherein the intelligent packet data register file cannot store all of the amount of packet data that is stored in the packet buffer memory;

(d) in response to the determining of (c) asserting a stall signal and issuing a packet portion request, wherein the asserting of the stall signal causes the pipelined processor to stop clocking, wherein the packet portion request is received by the packet buffer memory, and wherein the packet portion request comprises: 1) first information that identifies the packet portion, and 2) second information that identifies the pipelined processor;

(e) communicating the identified packet portion from the packet buffer memory to the intelligent packet data register file and loading the identified packet portion into the intelligent packet data register file of the pipelined processor;

(f) supplying the packet portion from the intelligent packet data register file to an execute stage of the pipelined processor;

(g) de-asserting the stall signal, wherein the de-asserting of the stall signal causes the pipelined processor to resume clocking; and (h) completing execution of the instruction by the pipelined processor.

19. The method of claim 18, wherein the first information that identifies the packet portion includes: 1) a start byte number, and 2) a number of bytes.

20. The method of claim 18, wherein the first information that identifies the packet portion includes: 1) a start value, and 2) a size value.

* * * * *